US012108435B2

(12) United States Patent
Elshafie et al.

(10) Patent No.: US 12,108,435 B2
(45) Date of Patent: Oct. 1, 2024

(54) INCENTIVE-BASED RELAYING WITH PRIORITIZATION

(71) Applicant: QUALCOMM Incorporated, San Diego, CA (US)

(72) Inventors: Ahmed Elshafie, San Diego, CA (US); Yi Huang, San Diego, CA (US); Hwan Joon Kwon, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 163 days.

(21) Appl. No.: 17/488,255

(22) Filed: Sep. 28, 2021

(65) Prior Publication Data

US 2022/0104211 A1 Mar. 31, 2022

Related U.S. Application Data

(60) Provisional application No. 63/084,517, filed on Sep. 28, 2020.

(51) Int. Cl.
*H04W 72/56* (2023.01)
*H04B 7/155* (2006.01)
(Continued)

(52) U.S. Cl.
CPC ............ *H04W 72/56* (2023.01); *H04B 7/155* (2013.01); *H04W 72/23* (2023.01); *H04W 72/044* (2013.01); *H04W 88/04* (2013.01)

(58) Field of Classification Search
CPC ...... H04B 7/155; H04W 72/56; H04W 72/23; H04W 72/044; H04W 88/04; H04W 8/04;
(Continued)

(56) References Cited

U.S. PATENT DOCUMENTS

2017/0303215 A1\* 10/2017 Kim ...................... H04W 52/48
2020/0037306 A1   1/2020 Seo
(Continued)

FOREIGN PATENT DOCUMENTS

CN          102572962 A   \*  7/2012  ............ H04W 72/08
CN          102573072 B   \* 10/2014
(Continued)

OTHER PUBLICATIONS

International Search Report and Written Opinion—PCT/US2021/052484—ISA/EPO—Jan. 28, 2022.
(Continued)

*Primary Examiner* — Rownak Islam
(74) *Attorney, Agent, or Firm* — Paul M. McAdams; Holland & Hart LLP

(57) ABSTRACT

Methods, systems, and devices for wireless communications are described. A base station may transmit signaling to a user equipment (UE) indicating one or more resources for a relay data transmission and a priority scheme for the relay data transmission and a current data transmission. The priority scheme may indicate a priority value for the relay data transmission and the current data transmission. The UE may selectively transmit the relay data transmission, the current data transmission, or both based on the priority scheme. If the priority scheme indicates the current data transmission has a higher priority than the relay data transmission, then the UE may transmit the current data transmission using the resources. If the priority scheme indicates the current data transmission has a lower priority than the relay data transmission, then the UE may transmit the relay data transmission using the resources.

28 Claims, 16 Drawing Sheets

(51) Int. Cl.
*H04W 72/23* (2023.01)
*H04W 72/044* (2023.01)
*H04W 88/04* (2009.01)

(58) Field of Classification Search
CPC .............. H04W 40/22; H04W 28/0221; H04L 47/6275; H04L 47/821; Y02D 30/70
USPC ........................................................ 370/315
See application file for complete search history.

(56) References Cited

U.S. PATENT DOCUMENTS

2020/0084792 A1    3/2020   Khoryaev et al.
2022/0022210 A1*   1/2022   Park ..................... H04W 72/566
2022/0394674 A1*  12/2022   Chen ................. H04W 72/0446

FOREIGN PATENT DOCUMENTS

CN          108028741 A  *  5/2018  ........... H04B 7/0617
WO     WO-2020006366 A1      1/2020

OTHER PUBLICATIONS

Zte, et al., "Discussion on UL and SL Prioritisation", 3GPP TSG RAN WG2 Meeting #108, 3GPP Draft, R2-1914536, 3rd Generation Partnership Project (3GPP), Mobile Competence Centre, 650, Route Des Lucioles, F-06921 Sophia-Antipolis Cedex, France, vol. RAN WG2, No. Reno, USA, Nov. 18, 2019-Nov. 22, 2019, 4 Pages, Nov. 8, 2019 (Nov. 8, 2019), XP051816602, Retrieved from the Internet: URL: https://ftp.3qpp.org/tsg_ran/WG2_RL2/TSGR2_108/Docs/R2-1914536.zip R2-1914536 Discussion on UL and SL prioritisation.doc [retrieved on Nov. 8, 2019] the whole document.

* cited by examiner

Source Data Transmission 305

Current Data Transmission 315

Relay Data Transmission 310

Feedback Message 330

INCENTIVE-BASED RELAYING WITH PRIORITIZATION

CROSS REFERENCE

The present Application for Patent claims the benefit of U.S. Provisional Patent Application No. 63/084,517 by ELSHAFIE et al., entitled "INCENTIVE-BASED RELAYING WITH VARIOUS PRIORITIZATION," filed Sep. 28, 2020, assigned to the assignee hereof, and expressly incorporated by reference herein.

FIELD OF TECHNOLOGY

The following relates to wireless communications, including incentive-based relaying with prioritization.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support incentive-based relaying with prioritization. Generally, the described techniques provide for a base station to configure a user equipment (UE) with one or more resources (e.g., time-frequency resources in a scheduling grant) for a relay data transmission and a priority scheme for the relay data transmission and a current data transmission. The priority scheme may indicate a priority value for the relay data transmission and the current data transmission. In some cases, the UE may selectively transmit the relay data transmission, the current data transmission, or both based on the priority scheme. In some cases, if the priority scheme indicates the current data transmission has a higher priority than the relay data transmission, then the UE may transmit the current data transmission using the resources. In some other cases, if the priority scheme indicates the current data transmission has a lower priority than the relay data transmission, then the UE may transmit the relay data transmission using the resources. In some examples, the UE may transmit both the relay data transmission and the current data transmission using a different power allocation or a different resource allocation for each data transmission.

DETAILED DESCRIPTION

Figure 1:
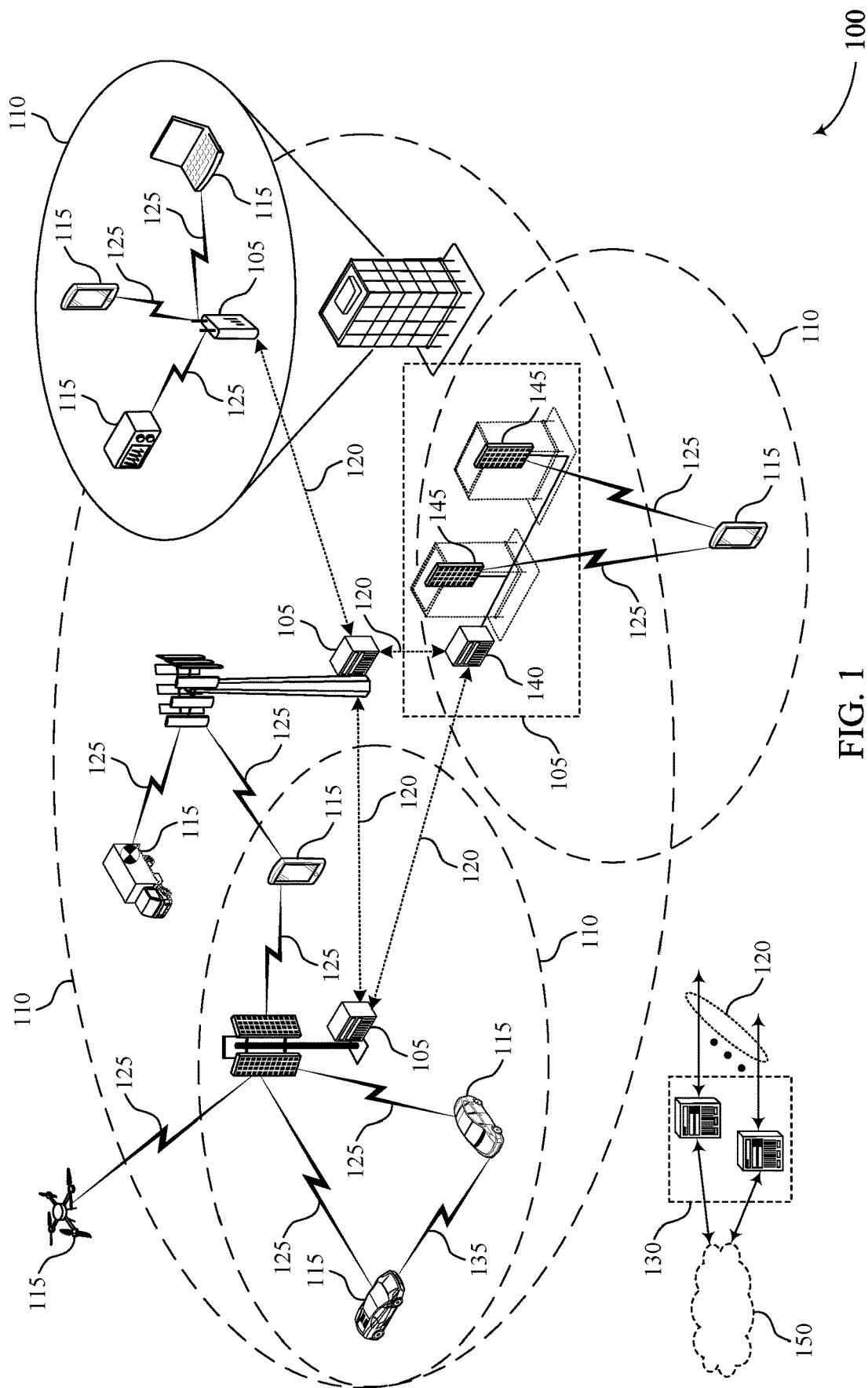
FIGS. 1 and 2 illustrate examples of wireless communications systems that support incentive-based relaying with prioritization in accordance with aspects of the present disclosure.

In some examples, a user equipment (UE) may communicate with a base station and other UEs using one or more relay UEs. For example, a base station may transmit control signaling to set up one or more relay UEs in a multi-hop tunnel. That is, a transmission may hop from a source UE to one or more other relay UEs before reaching a destination (e.g., another UE). The base station may broadcast the control signaling, may groupcast the control signaling, or the like. The base station may use the one or more relay UEs in the multi-hop tunnel to transmit control signaling, data or both. However, if a UE is operating as a relay, the UE may be unable to transmit data or control signaling concurrent with relaying the transmission, which may cause signaling delays while the UE relays the transmission from the source UE.

As described herein, a base station may configure a UE with a priority value for a relay data transmission and a current transmission, such as from the UE to the base station (e.g., the UE's own data). In some cases, a base station may transmit control signaling (e.g., a downlink control information (DCI) message) including a configuration for transmitting data in a relay operational mode and transmitting data in a UE operational mode. For example, the control signaling may include a priority for the data transmissions. In some cases, the UE may transmit the relay data transmission, a current data transmission, or both using an uplink grant indicated by the base station (e.g., in the control signaling). The uplink grant may include one or more time-frequency resources for the transmission. The UE may send its own data using the uplink grant, may send the relay data using the uplink grant, may send its own data and the relay data using the uplink grant with different power allocations, or may send its own data and the relay data using separate time-frequency resource allocations. In some cases, the UE may transmit the data with a higher priority during the uplink grant. For example, if the relay data transmission has a higher priority, the UE may relay the data transmission during the resources indicated in the uplink grant. If the current data transmission has a higher priority, the UE may transmit the data to a base station or another UE during the resources indicated in the uplink grant.

Particular aspects of the subject matter described in this disclosure may be implemented to realize one or more of the following potential advantages. The techniques employed by the described UEs may provide benefits and enhancements to the operation of the UEs. For example, operations performed by the UEs may provide improvements to wireless operations. Implementing various aspects of this disclosure may allow for a base station to transmit control signaling including a priority scheme to a UE, which may include a priority indication of a relay data transmission and a current data transmission for the UE. Selectively relaying the data transmission or transmitting the current data transmission may reduce the delay for higher priority transmissions. For example, UEs capable of relaying a data transmission and transmitting current data transmissions may use the techniques described herein to reduce signaling latency related to relaying a lower priority data transmission or transmitting a lower priority data transmission prior to a higher priority data transmission while ensuring reliable and efficient communications between UEs and base stations, among other benefits.

Aspects of the disclosure are initially described in the context of wireless communications systems. Aspects of the disclosure are further described in the context of a timeline and process flow. Aspects of the disclosure are further illustrated by and described with reference to apparatus diagrams, system diagrams, and flowcharts that relate to incentive-based relaying with prioritization.

FIG. 1 illustrates an example of a wireless communications system 100 that supports incentive-based relaying with prioritization in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beamforming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, a base station 105 may configure multiple UEs 115 in a multi-hop tunnel operation. For example, the base station 105 may configure multiple UEs to operate in a relay mode using broadcast signaling, groupcast signaling, or the like. A UE 115 operating in a relay mode may transmit signaling or data to another UE 115 or a base station 105. The base station 105 may include an indication of one or more dedicate time-frequency resources while configuring the multiple UEs 115 to operate in the relay mode. The multiple UEs 115 may operate as relays during the dedicated time-frequency resources to improve uplink coverage enhancements for signaling to the base station 105. However, if the UE 115 is operating in a relay mode, the UE 115 may not transmit current data (e.g., the data of the UE 115), while relaying a relay data transmission during the indicated resources, which may cause delays related to relaying the relay data transmission prior to transmitting a current data transmission.

In some cases, a base station 105 may configure a UE 115 with one or more resources (e.g., time-frequency resources in a scheduling grant) for a relay data transmission and a priority scheme for the relay data transmission and a current data transmission. The priority scheme may indicate a priority value for the relay data transmission and the current data transmission. In some cases, the UE 115 may transmit the current data transmission (e.g., to the base station 105 or to another UE 115), the relay data transmission, or both during the one or more resources. For example, the UE 115 may selectively transmit the relay data transmission, the current data transmission, or both based on the priority scheme. In some cases, if the priority scheme indicates the current data transmission has a higher priority than the relay data transmission, then the UE 115 may transmit the current data transmission using the resources. In some other cases, if the priority scheme indicates the current data transmission has a lower priority than the relay data transmission, then the UE 115 may transmit the relay data transmission using the resources for relaying the data transmission.

In some examples, the UE 115 may transmit both the relay data transmission and the current data transmission using a different power allocation for each data transmission. In some other examples, the UE 115 may transmit both the relay data transmission and the current data transmission using a different resource allocation (e.g., a different time-frequency allocation).

Figure 2:
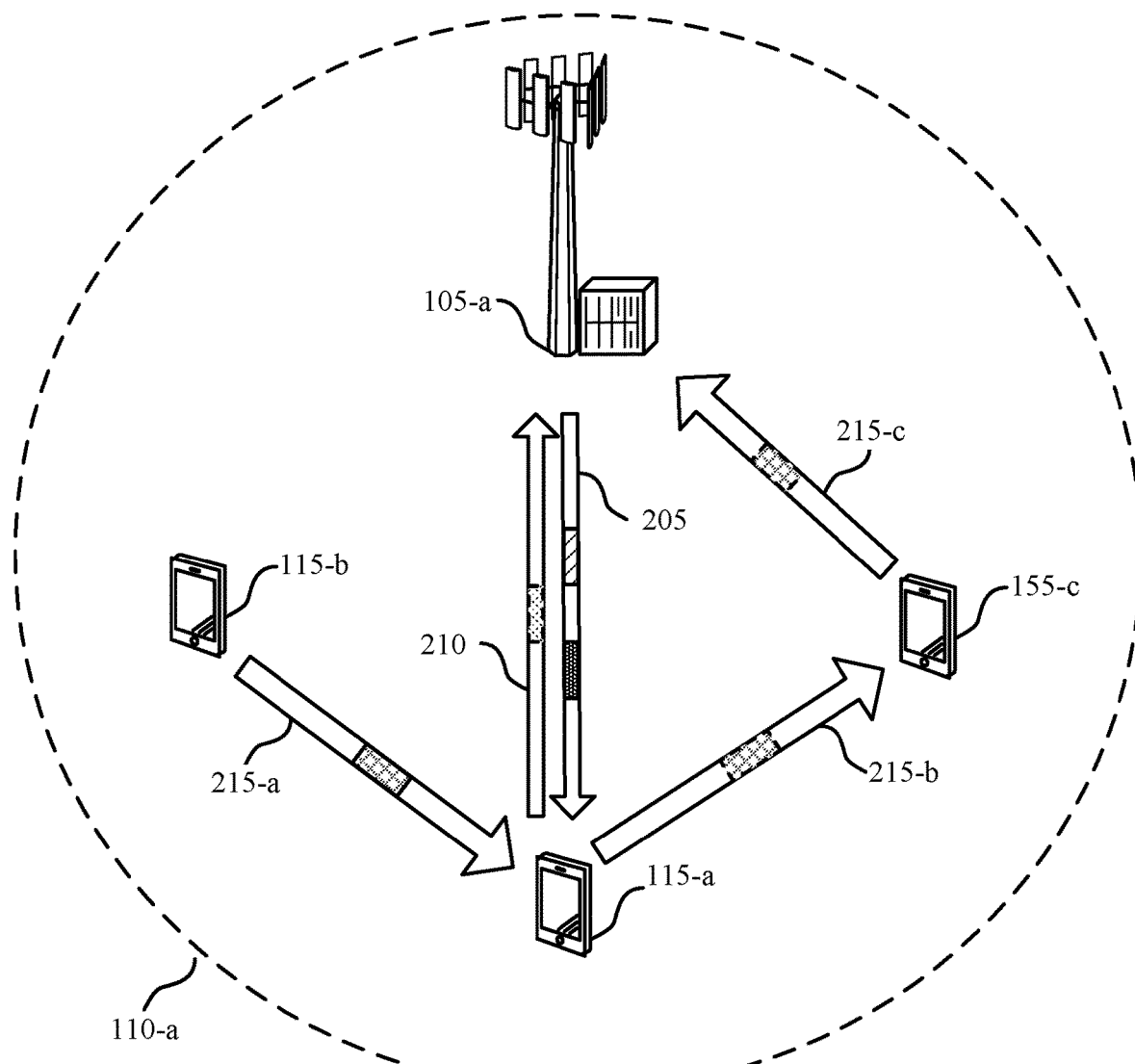

FIG. 2 illustrates an example of a wireless communications system 200 that supports incentive-based relaying with prioritization in accordance with aspects of the present disclosure. In some examples, wireless communications system 200 may implement aspects of wireless communications system 100 and may include UE 115-a through UE 115-c and base station 105-a with coverage area 110-a, which may be examples of UEs 115 and a base station 105 with a coverage area 110 as described with reference to FIG. 1. In some examples, base station 105-a may communicate control signaling or data with a UE 115, such as UE 115-a through UE 115-c, using a downlink communication link 205. Additionally or alternatively, the UE 115 may communicate control signaling or data with the base station 105-a using an uplink communication link 210. In some cases, base station 105-b may configure UE 115-a with a priority value for a relay data transmission and a current data transmission (e.g., the data of UE 115-a).

In some cases, a base station 105, such as base station 105-a, may configure multiple UEs 115 in a multi-hop tunnel operation. For example, base station 105-a may configure UE 115-a through UE 115-c to operate in a relay mode using broadcast signaling, groupcast signaling, or the like. In some cases, the base station 105 may transmit uplink semi-persistent scheduling (SPS) signaling (e.g., through UL-SPS-Config) including to configure the UEs 115. For example, the base station 105 may transmit the SPS signaling including the configuration using RRC signaling, a medium access control-control element (MAC-CE), or the like.

A UE 115 operating in a relay mode may transmit signaling or data to another UE 115 or a base station 105 using a relay communication link 215, which may be an example of dedicated uplink tunneling. Base station 105-a may include one or more dedicate time-frequency resources while configuring UE 115-a through UE 115-c to operate in the relay mode, such as an indication of one or more resources for relaying a data transmission 220. UE 115-a through UE 115-c may operate as relays during the dedicated time-frequency resources to improve uplink coverage enhancements for signaling to base station 105-a. In some cases, while UE 115-a through UE 115-c are operating in a relay mode, a source UE 115, such as UE 115-b, may relay a data transmission 225 to a relay UE 115, such as UE 115-a, UE 115-c, or both. For example, UE 115-b may relay a data transmission 225 to UE 115-a via relay communication link 215-a. UE 115-a through UE 115-c may be operating as part of an uplink multi-hop tunnel, so UE 115-a may relay the data transmission 220 to UE 115-c via relay communication link 215-b. UE 115-c may relay the data transmission 220 to base station 105-a via relay communication link 215-c. In some cases, UE 115-c may transmit a current data transmission (e.g., the data of UE 115-c) to base station 105-a via the relay communication link 215-c. In some cases, UE 115-c may both transmit a current data transmission (e.g., the data of UE 115-c) and a relay a data transmission 225 (e.g., the data of a source UE 115, such as UE 115-b, via an intermediate relay UE 115, such as relay UE 115-a) to base station 105-a via the relay communication link 215-c. In some cases, a relay communication link 215 may give the UE 115 a direct communication link with the next UE 115 in the multi-hop tunneling operation (e.g., regardless of the number of hops). However, if the UE 115 is operating in a relay mode, the UE 115 may not transmit current data (e.g., the data of the UE 115), while relaying a relay data transmission 225 during the indicated one or more resources for relaying the data transmission 220, which may cause delays related to relaying the relay data transmission 225 prior to transmitting a current data transmission 230.

In some cases, a base station 105 may configure a UE 115 with a priority scheme 235 for a relay data transmission 225 and a current data transmission 230. For example, base station 105-a may transmit an indication of resources for relaying a data transmission 220 and a priority scheme 235 to UE 115-a (e.g., if UE 115-a is operating as a relay) via a downlink communication link 205. The priority scheme 235 may indicate a priority value for the relay data transmission 225 and the current data transmission 230. Base station 105-a may transmit the priority scheme 235 via DCI signaling. In some cases, UE 115-a may transmit a current data transmission 230 (e.g., to base station 105-a via an uplink communication link 210 or to another UE 115 via a sidelink communication link), a relay data transmission 225, or both during the resources for relaying the data transmission 220. That is, UE 115-b may use the uplink grant dedicated for the relay data transmission 225 for transmission of the current data transmission 230. In some examples, priority scheme 235 may indicate a priority indicator for the UE 115. For example, UE 115-c may receive a first priority indication via control signaling (e.g., DCI signaling) for using an uplink grant dedicated for the relay data transmission 225 for relay data transmission 225. In some cases, the UE 115-c may receive a second priority indication different from the first priority indication via control signaling (e.g., DCI signaling) for using the uplink grant reserved or dedicated for relay data transmission 225 (i.e., absent a base station 105-a to the contrary) for transmission of the current data transmission 230. In some cases, the UE 115-c may receive a third priority indication different from the first and second priority indications via control signaling (e.g., DCI signaling) for using the uplink grant reserved or dedicated for relay data transmission 225 (i.e., absent a base station 105-a to the contrary) for transmission of both for the relay data transmission 225 and the current data transmission 230. In some case, the third indication may further indicate that the relay data transmission 225 and the current data transmission 230 are transmitted at a same time over an entire allocation with different power allocations, and a fourth indication different from the third indication may further indicate that the relay data transmission 225 and the current data transmission 230 are transmitted with different time-domain and/or frequency domain allocations. In some examples, the UE 115-c may receive the priority indications via control signaling (e.g., DCI signaling) in the form of one or more bits (e.g., bits '00' to indicate the first priority indication, bits '01' to indicate the second priority indication, bits '10' to indicate the third priority indication, and bits '11' to indicate the fourth priority indication). In some cases, when the third priority indication is signaled, a further indication of a power factor (e.g., an a value) may signaled (e.g., by same or additional DCI signaling) indicating a power assigned to the relay data transmission 225 and the current data transmission 230. In some cases, when the fourth priority indication is signaled, a further indication (e.g., one or more additional bits) may signaled (e.g., by same or additional DCI signaling) indicating time time-domain resources and/or frequency-domain resources for the relay data transmission 225 and the current data transmission 230.

In some cases, UE 115-b may transmit the current data transmission 230 using the resources for relaying the data transmission 220. Additionally or alternatively, UE 115-a may transmit the relay data transmission 225 using the resources for relaying the data transmission 220. UE 115-a may selectively transmit the relay data transmission 225, the current data transmission 230, or both based on the priority scheme 235. For example, if the priority scheme 235 indicates the current data transmission 230 has a higher priority than the relay data transmission 225, then UE 115-a may transmit the current data transmission 230 using the resources for relaying the data transmission 220. In some other examples, if the priority scheme 235 indicates the current data transmission 230 has a lower priority than the relay data transmission 225, then UE 115-a may transmit the relay data transmission 225 using the resources for relaying the data transmission 220. In some cases, if the UE 115-a does not transmit both the relay data transmission 225 and the current data transmission 230 using the resources for relaying the data transmission 220 (e.g., if a data transmission has a higher priority value based on the priority scheme 235), base station 105-a may assign an additional resource allocation for the data transmission that UE 115-a does not transmit.

In some other examples, UE 115-a may transmit both the relay data transmission 225 and the current data transmission 230 using a different power allocation for each data transmission. That is, UE 115-a, which may be operating in a relay mode, may send both the relay data transmission 225 and the current data transmission 230 to a base station 105 at the same time using non-orthogonal multiple access (NOMA) signaling (e.g., with a different power allocation between packets in a data transmission from a source UE 115 and a current data transmission from the relay UE 115). If UE 115-b transmits both the relay data transmission 225 and the current data transmission 230 to base station 105-a (e.g., a concurrent transmission), base station 105-a may perform interference cancellation using information from a source UE 115 (e.g., from a transmission from the source UE 115, such as UE 115-b), the relay data transmission 225 (e.g., from a relay UE 115, such as UE 115-a), the current data transmission 230 (e.g., from UE 115-a), or a combination. In some cases, the UE 115-a may receive control signaling (e.g., DCI signaling) indicating whether NOMA signaling or concurrent transmission where interference cancellation may be performed by the base station 105-a.

In some examples, UE 115-a may transmit both the relay data transmission 225 and the current data transmission 230 using a different resource allocation (e.g., a different time-frequency allocation). For example, UE 115-a may use a different resource block allocation bitmap for the relay data transmission 225 and the current data transmission 230, which may be signaled in common or groupcast DCI. Additionally or alternatively, various control signaling techniques may be used in accordance with the aspects discussed herein. For example, time and frequency resources for relaying a data transmission may be indicated to one or more UE 115 using control signaling such as but not limited to RRC signaling, MAC-CE signaling, and/or DCI (e.g., common or groupcast) signaling. In some cases, a priority scheme for using the time and frequency resources for relaying the data transmission as one or both of a relay data transmission and a current data transmission (e.g., a first priority indication, a second priority indication, a third priority indication, a fourth priority indication, etc.) may be indicated to one or more UE 115 using control signaling such as but not limited to RRC signaling and MAC-CE signaling (e.g., as an initial configuration). Additionally or alternatively, the priority scheme may be indicated to one or more UE 115 using control signaling such as but not limited to RRC signaling, MAC-CE signaling, and/or DCI (e.g., common, groupcast, or UE-specific) signaling.

Figure 3:
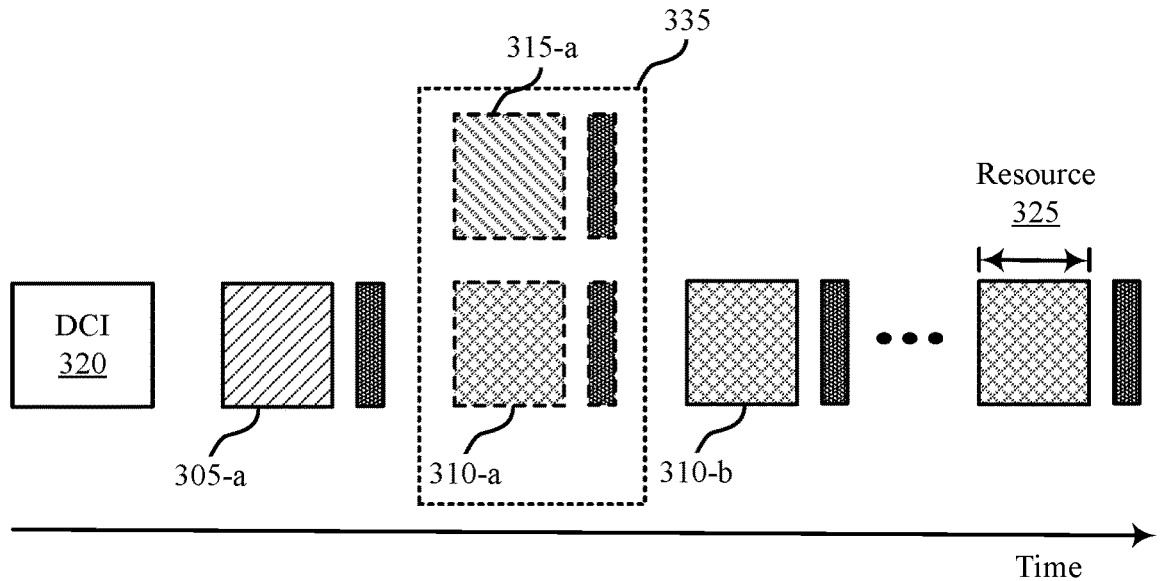
FIG. 3 illustrates an example of a timeline that supports incentive-based relaying with prioritization in accordance with aspects of the present disclosure.
Figure 3:
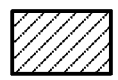
Figure 3:
Figure 3:
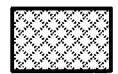
Figure 3:
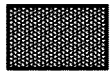

FIG. 3 illustrates an example of a timeline 300 that supports incentive-based relaying with prioritization in accordance with aspects of the present disclosure. In some examples, timeline 300 may implement aspects of wireless communication system 100, wireless communications system 200, or both. Timeline 300 may be implemented by multiple UEs 115 and a base station 105 in a multi-hop tunneling operation, as described with reference to FIGS. 1 and 2. For examples, one or more UEs 115 may be configured to operate in a relay mode to transmit a source data transmission 305 from a source UE 115 as a relay data transmission 310 to other relay UEs 115 or a base station 105. In some examples, the base station 105 may configure a relay UE 115 with a priority scheme for the relay data transmission 310 and a current data transmission 315 (e.g., with data from the UE 115) that allows the UE 115 to selectively relay or transmit a data transmission based on a priority value of the data transmission, which may be indicated in the priority scheme.

In some cases, a UE 115 operating in a relay mode may be configured with one or more time-frequency resources for relaying a relay data transmission 310 from a source UE 115. In some cases, the resources may be indicated in DCI 320. That is, the source UE 115 may transmit a source data transmission 305 to a relay UE 115, and the relay UE 115 may relay the source data transmission 305 during the one or more time-frequency resources, such as during a resource 325, by transmitting a relay data transmission 310 including the source data transmission 305 to another relay UE 115 or a base station 105. For example, the resource 325 may include time domain resources allocated for physical uplink shared data channel (PUSCH) via RRC or DCI signaling. In some cases (e.g., when signaled via RRC), a time domain resource allocation for the resource 325 may include one or more of a slot offset ($K_2$), a PUSCH mapping type, a staring symbol, and a number of allocated symbols (length). In some cases, the UE 115 (e.g., a relay UE 115 or a source UE 115) may transmit a feedback message 330, such as a HARQ-ACK to the base station 105 after transmitting the relay data transmission 310. In some cases, the base station 105 may transmit a feedback message 330, such as a HARQ-ACK to the UE 115 (e.g., a relay UE 115 or a source UE 115). In some cases, the feedback message 330 may be transmitted on a physical data control channel (PDCCH) and the HARQ-ACK may provide a positive acknowledgement or a negative acknowledgement of the data transmitted by the UE 115 (e.g., a source data transmission 305, a relay data transmission 310, or a current data transmission 315).

In some examples, there may be multiple relay UEs 115 in a multi-hop tunneling operation. For example, a first UE 115 in the multi-hop tunneling operation may receive source data transmission 305-a and may transmit relay data transmission 310-a to the next UE 115 in the multi-hop tunneling operation. The next UE 115 may continue the multi-hop tunneling operation by transmitting relay data transmission 310-b to the next UE 115. The relay UEs 115 may continue to transmit the relay data transmission 310 during allocated time-frequency resources (e.g., relay data transmission 310-c during a particular occasion of or time instance for a resource 325 having time-domain and frequency-domain resource assignments) until the relay data transmission 310 reaches a base station 105. However, if a relay UE 115 is transmitting a relay data transmission 310, the relay UE 115 may be unable to transmit a current data transmission 315.

In some cases, a base station 105 may configure a relay UE 115 with a priority scheme in addition to the one or more time-frequency resources (e.g., in DCI 320). The priority scheme may indicate a priority value for the relay data transmission 310 and a current data transmission 315 to the relay UE 115. For example, at 335, a relay UE 115 that is scheduled to transmit relay data transmission 310-a may determine a priority value associated with relay data transmission 310-a and current data transmission 315-a. If the priority value for relay data transmission 310-a is greater than the priority value for current data transmission 315-a, the relay UE 115 may transmit relay data transmission 310-a during the one or more time-frequency resources (e.g., during a particular occasion of or time instance for a resource 325 at a frequency specified in control signaling, such as DCI 320). If the priority value for relay data transmission 310-a is less than the priority value for current data transmission 315-a, the relay UE 115 may transmit current data transmission 315-a during the one or more time-frequency resources. In some cases, the relay UE 115 may transmit both current data transmission 315-a and relay data transmission 310-a using different power allocations or different time-frequency resource allocations. The relay UE 115 may transmit a feedback message 330 based on transmitting relay data transmission 310-a, current data transmission 315-a, or both. In some cases, if the relay UE 115 is unable to transmit both current data transmission 315-a and relay data transmission 310-a, the base station 105 may transmit a resource allocation for the data transmission the relay UE 115 was unable to transmit.

Figure 4:
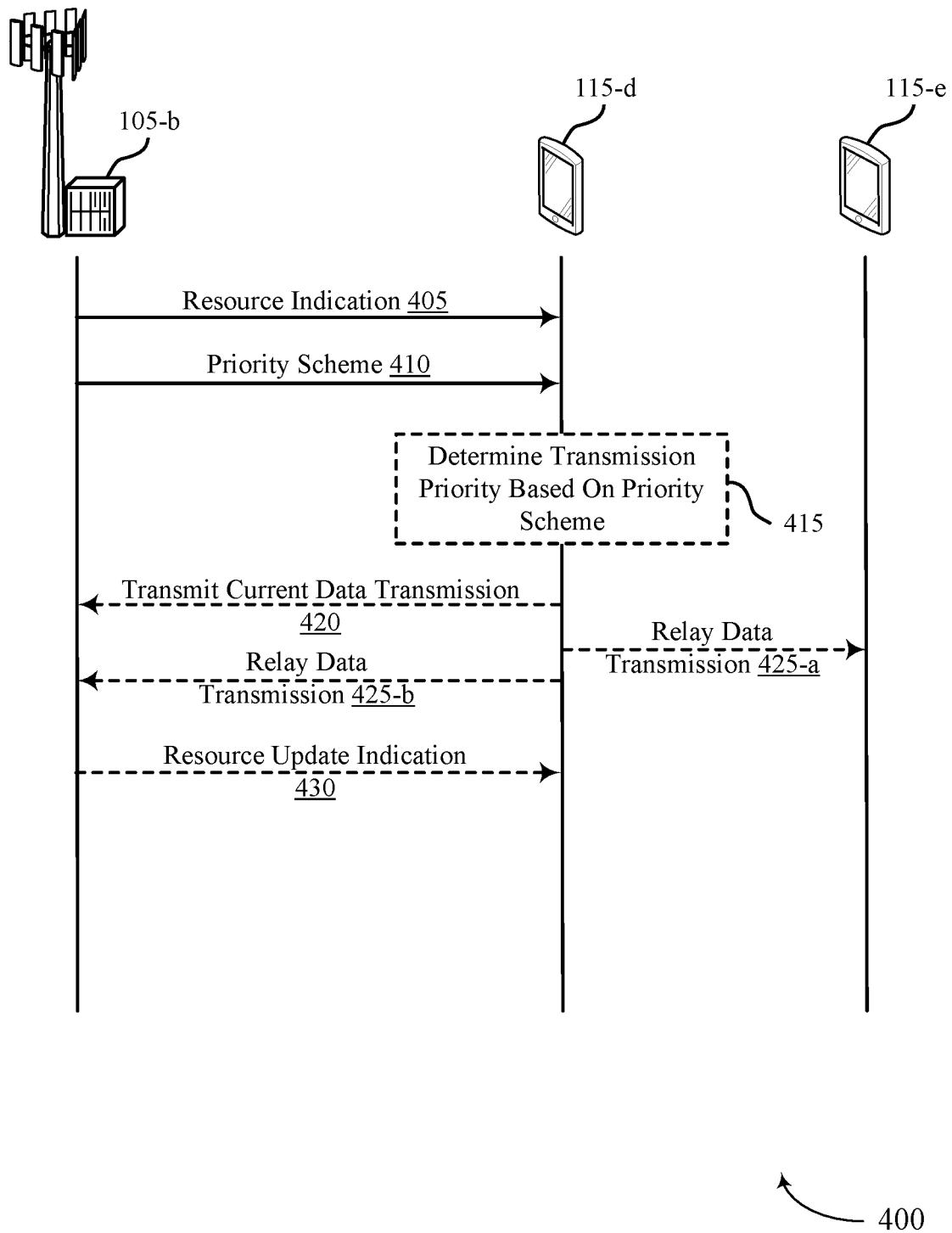
FIG. 4 illustrates an example of a process flow that supports incentive-based relaying with prioritization in accordance with aspects of the present disclosure.

FIG. 4 illustrates an example of a process flow 400 that supports incentive-based relaying with prioritization in accordance with aspects of the present disclosure. In some examples, process flow 400 may implement aspects of wireless communication system 100, wireless communications system 200, timeline 300, or a combination. The process flow 400 may illustrate an example of a base station 105 configuring a relay UE 115 with a priority scheme for transmitting a relay data transmission and a current data transmission according to a priority value for each. Alternative examples of the following may be implemented, where some processes are performed in a different order than described or are not performed. In some cases, processes may include additional features not mentioned below, or further processes may be added.

At 405, a UE 115-d, which may be an example of a UE 115 operating in a relay mode (e.g., a relay UE 115), may receive an indication from base station 105-b of resources, such as time-frequency resources, for relaying a data transmission from a source UE 115 to one or more relay UEs 115 (e.g., to UE 115-e).

At 410, UE 115-d may receive control signaling (e.g., a DCI message) from base station 105-b including a priority scheme for the relay data transmission and a current data transmission (e.g., including data from UE 115-d). For example, the priority scheme may include a priority value (or indication of relative priority or intended usage) for the relay data transmission and a priority value (or indication of relative priority or intended usage) for the current data transmission.

In some cases, UE 115-d may selectively transmit the relay data transmission, the current data transmission, or both during the resources indicated at 405 based on the priority scheme. For example, at 415, UE 115-d may determine a transmission priority value of the relay data transmission and the current data transmission (e.g., indicated as a bit in the control signaling for the priority scheme). If the priority value (or indication of relative priority or intended usage) for the current data transmission is greater than (or indicative of a higher priority than) the priority value (or indication of relative priority or intended usage) for the relay data transmission, at 420, UE 115-d may transmit the current data transmission to base station 105-b. If the priority value for the current data transmission is less than (or indicative of a lower priority than) the priority value for the relay data transmission, at 425-a, the UE 115-d may transmit the relay data transmission to the UE 115-e, or at 425-b, the UE 115-d may transmit the relay data transmission to the base station 105-b relaying data from the UE 115-e (i.e., the source UE).

In some cases, the UE 115-d may determine to transmit both the current data transmission at 420 and the relay data transmission at 425 (e.g., at 425-a or 425-b). In some cases, the relay data transmission is a physical layer transmission and can be multiplexed with the current data transmission at the physical layer. For example, the UE 115-d may determine a power allocation or a time-frequency resource allocation for each data transmission (e.g., a different power allocation or time-frequency resource allocation for the current data transmission at 420 and the relay data transmission at 425-a or 425-b) and may transmit both data transmissions according to the power allocation or the time-frequency resource. For example, the UE 115-*d* may receive control signaling indicating the time resource allocation and a resource block allocation bitmap indicating the frequency resource allocation for the data transmissions.

At 430, the UE 115-*d* may receive an indication from the base station 105-*b* of updated resources for transmitting the relay data transmission or the current data transmission (e.g., if UE 115-*d* is unable to transmit either the current data transmission at 420 or the relay data transmission at 425-*a* or 425-*b* based on the priority scheme).

Figure 5:
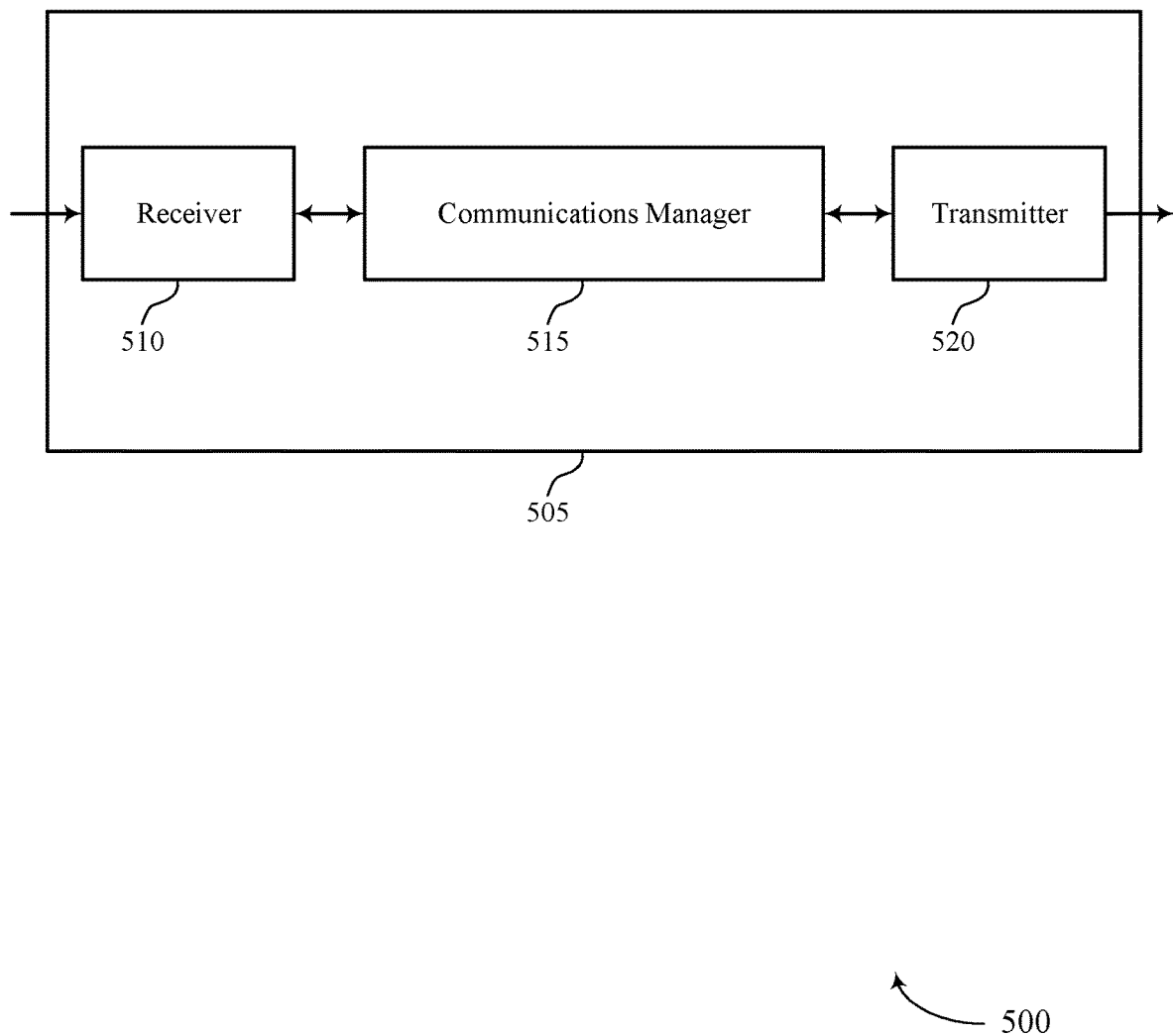
FIGS. 5 and 6 show block diagrams of devices that support incentive-based relaying with prioritization in accordance with aspects of the present disclosure.

FIG. 5 shows a block diagram 500 of a device 505 that supports incentive-based relaying with prioritization in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to incentive-based relaying with prioritization, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may receive, from a base station, an indication of resources for relaying a first data transmission from a source UE to one or more relay UEs, receive, from the base station, control signaling including a priority scheme for the first data transmission and a second data transmission, and selectively relay the first data transmission, transmitting the second data transmission, or both according to the priority scheme and during the indicated resources. The communications manager 515 may be an example of aspects of the communications manager 810 described herein.

The actions performed by the communications manager 515 as described herein may be implemented to realize one or more potential advantages. One implementation may enable a base station to configure a UE operating as a relay with a priority scheme for one or more data transmissions. The priority scheme may enable the UE to transmit a current data transmission (e.g., with data from the UE) or relay a data transmission based on the data transmission with the higher priority value, which may improve communication latency (e.g., related to delays while the UE relays a data transmission), among other advantages.

Based on implementing the priority scheme as described herein, a processor of a UE or a base station (e.g., a processor controlling the receiver 510, the communications manager 515, the transmitter 520, or a combination thereof) may reduce the impact or likelihood of inefficient communications due to the UE operating as a relay and ensuring relatively efficient communications. For example, the UE may leverage a time-frequency resource allocation or a power allocation for data transmissions, which may realize improved resource allocation at the UE, among other benefits.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate-array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
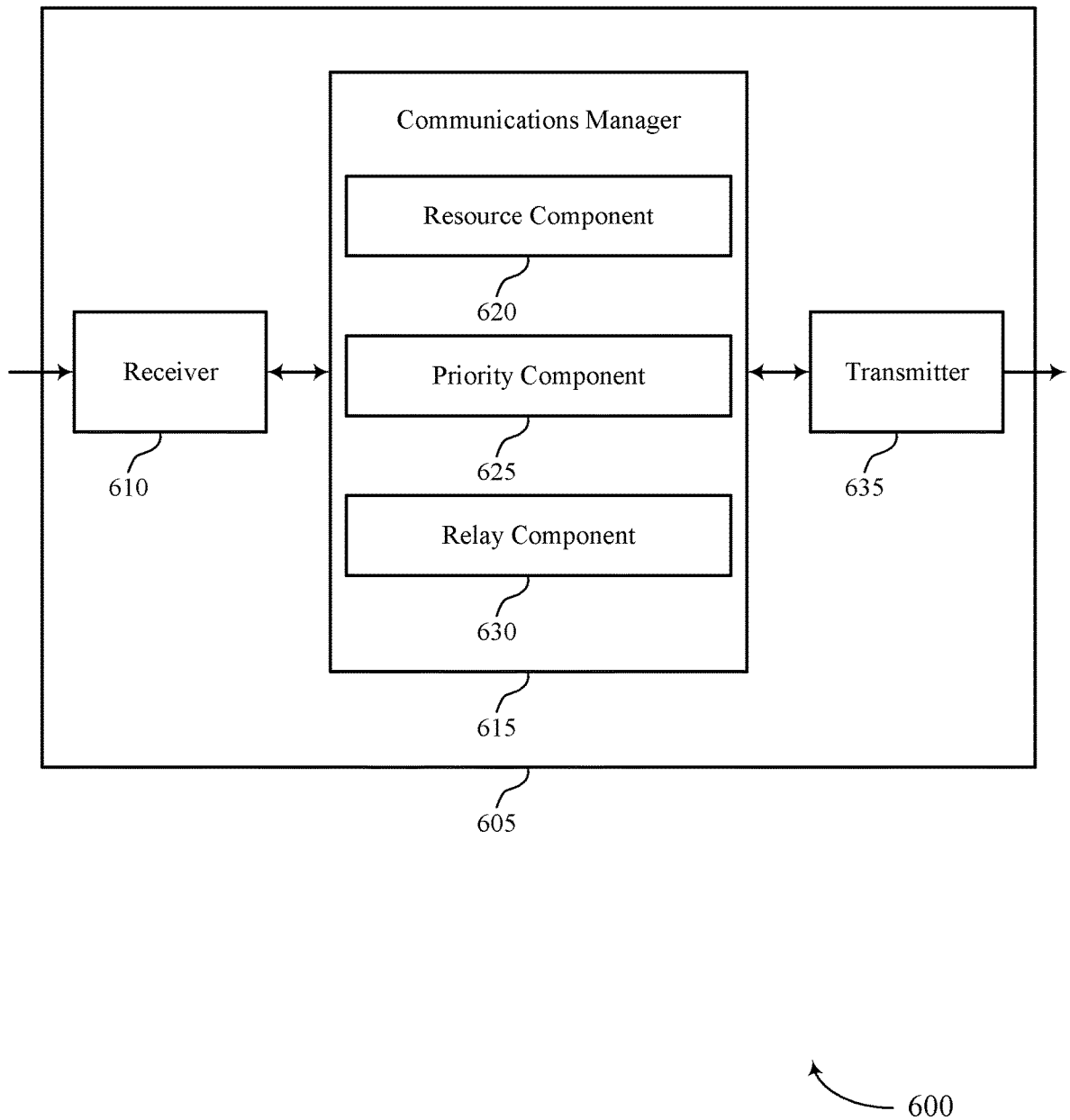

FIG. 6 shows a block diagram 600 of a device 605 that supports incentive-based relaying with prioritization in accordance with aspects of the present disclosure. The device 605 may be an example of aspects of a device 505, or a UE 115 as described herein. The device 605 may include a receiver 610, a communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to incentive-based relaying with prioritization, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a resource component 620, a priority component 625, and a relay component 630. The communications manager 615 may be an example of aspects of the communications manager 810 described herein.

The resource component 620 may receive, from a base station, an indication of resources for relaying a first data transmission from a source UE to one or more relay UEs. The priority component 625 may receive, from the base station, control signaling including a priority scheme for the first data transmission and a second data transmission. The relay component 630 may selectively relay the first data transmission, transmitting the second data transmission, or both according to the priority scheme and during the indicated resources.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

Figure 7:
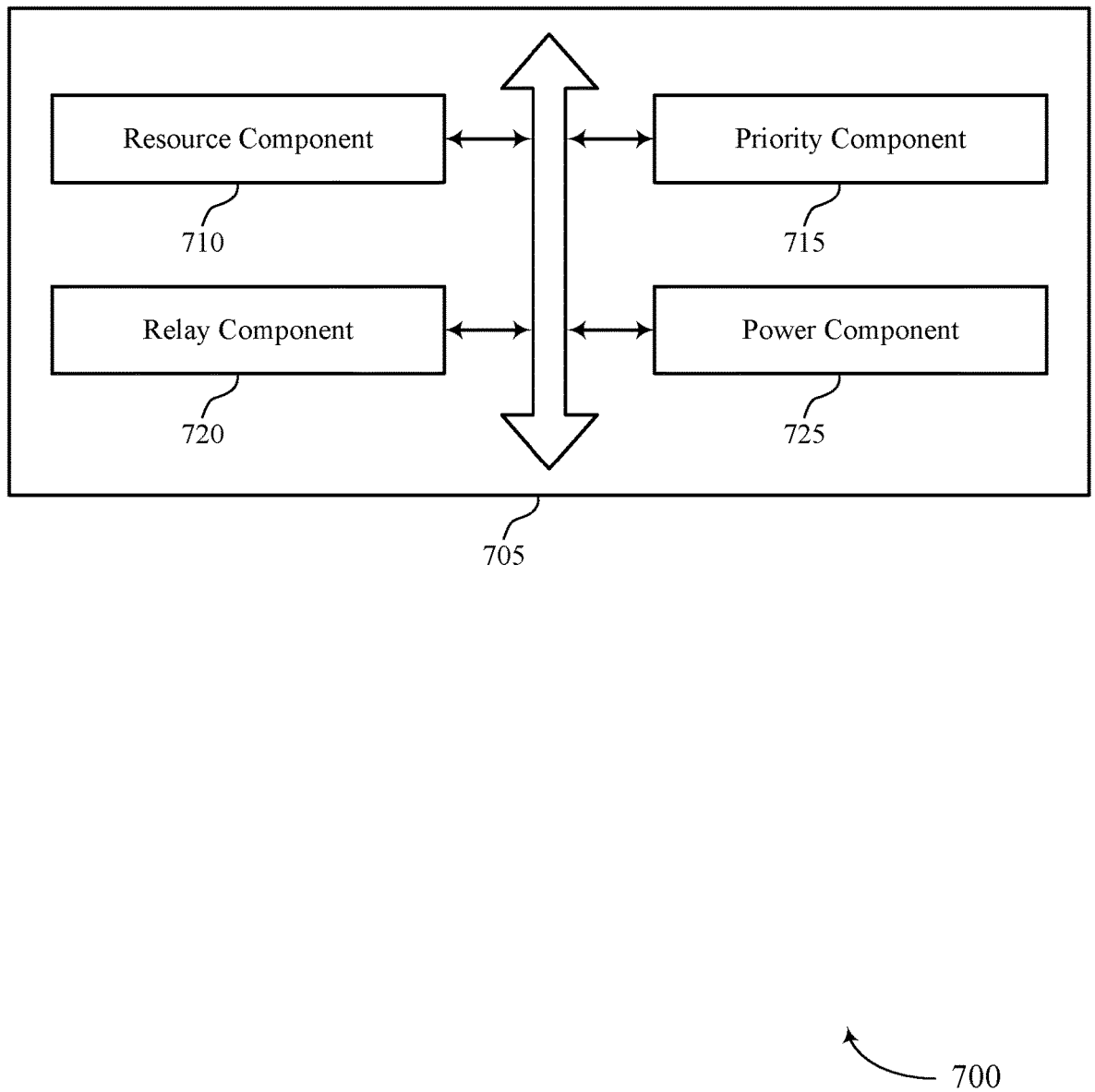
FIG. 7 shows a block diagram of a communications manager that supports incentive-based relaying with prioritization in accordance with aspects of the present disclosure.

FIG. 7 shows a block diagram 700 of a communications manager 705 that supports incentive-based relaying with prioritization in accordance with aspects of the present disclosure. The communications manager 705 may be an example of aspects of a communications manager 515, a communications manager 615, or a communications manager 810 described herein. The communications manager 705 may include a resource component 710, a priority component 715, a relay component 720, and a power component 725. Each of these modules may communicate, directly or indirectly, with one another (e.g., via one or more buses).

The resource component 710 may receive, from a base station, an indication of resources for relaying a first data transmission from a source UE to one or more relay UEs. The priority component 715 may receive, from the base station, control signaling including a priority scheme for the first data transmission and a second data transmission. The relay component 720 may selectively relay the first data transmission, transmitting the second data transmission, or both according to the priority scheme and during the indicated resources.

In some examples, the resource component 710 may determine a first time-frequency resource allocation for the first data transmission and a second time-frequency resource allocation for the second data transmission. In some examples, the resource component 710 may relay the first data transmission and transmitting the second data transmission according to the first time-frequency resource allocation and the second time-frequency resource allocation.

In some examples, the resource component 710 may receive, from the base station, the control signaling including an indication of a time resource allocation and a resource block allocation bitmap corresponding to the first data transmission and the second data transmission.

In some examples, the resource component 710 may receive, from the base station, an indication of updated resources based on the priority scheme.

In some examples, the priority component 715 may determine the first data transmission has a first priority and the second data transmission has a second priority greater than the first priority based on the priority scheme. In some examples, the priority component 715 may transmit the second data transmission during the indicated resources based on the second priority being greater than the first priority.

In some examples, the priority component 715 may determine the first data transmission has a first priority and the second data transmission has a second priority lower than the first priority based on the priority scheme. In some examples, the priority component 715 may relay the first data transmission during the indicated resources based on the second priority being lower than the first priority.

The power component 725 may determine a first power allocation for the first data transmission and a second power allocation for the second data transmission. In some examples, the power component 725 may relay the first data transmission and transmitting the second data transmission during the indicated resources according to the first power allocation and the second power allocation, where the first power allocation is different from the second power allocation.

Figure 8:
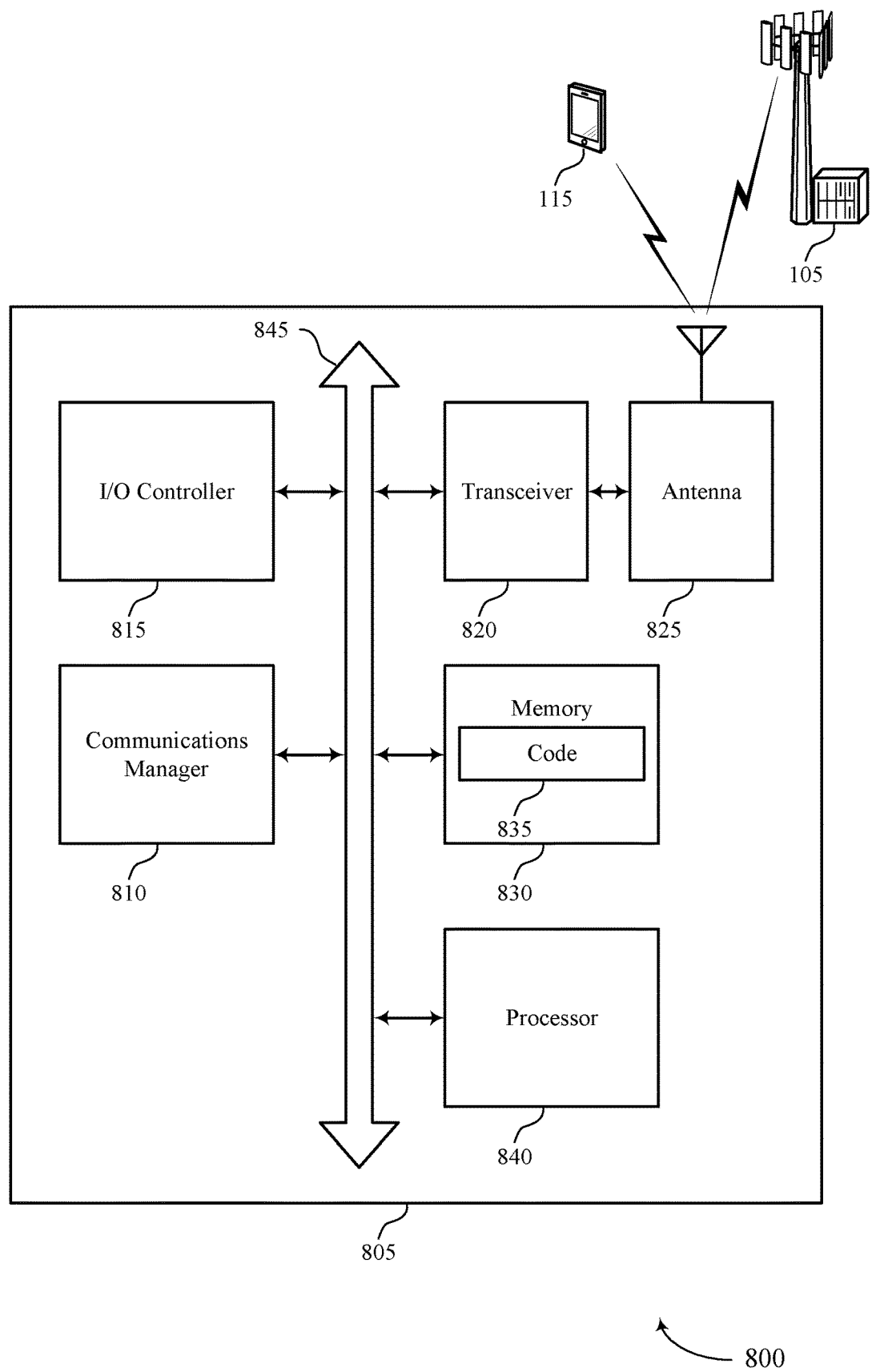
FIG. 8 shows a diagram of a system including a device that supports incentive-based relaying with prioritization in accordance with aspects of the present disclosure.

FIG. 8 shows a diagram of a system 800 including a device 805 that supports incentive-based relaying with prioritization in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive, from a base station, an indication of resources for relaying a first data transmission from a source UE to one or more relay UEs, receive, from the base station, control signaling including a priority scheme for the first data transmission and a second data transmission, and selectively relay the first data transmission, transmitting the second data transmission, or both according to the priority scheme and during the indicated resources.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a BIOS which may control basic hardware or software operation such as the interaction with peripheral components or devices.

The processor 840 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting incentive-based relaying with prioritization).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
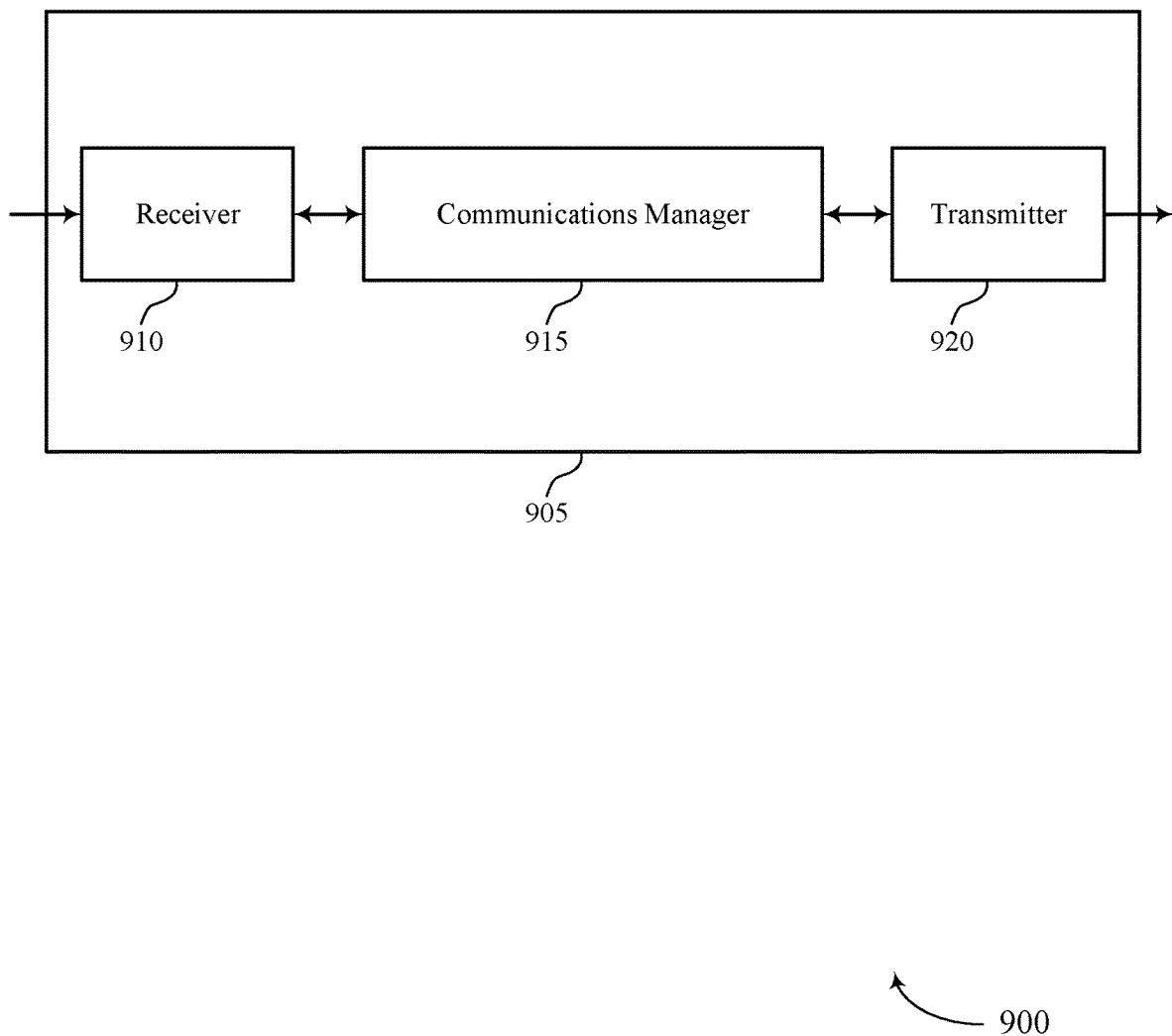
FIGS. 9 and 10 show block diagrams of devices that support incentive-based relaying with prioritization in accordance with aspects of the present disclosure.

FIG. 9 shows a block diagram 900 of a device 905 that supports incentive-based relaying with prioritization in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to incentive-based relaying with prioritization, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may transmit, to a UE of a set of UEs, an indication of resources for relaying a first data transmission from a source UE to one or more relay UEs and transmit, to the set of UEs, control signaling including a priority scheme for a set of data transmissions including the first data transmission and a second data transmission. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
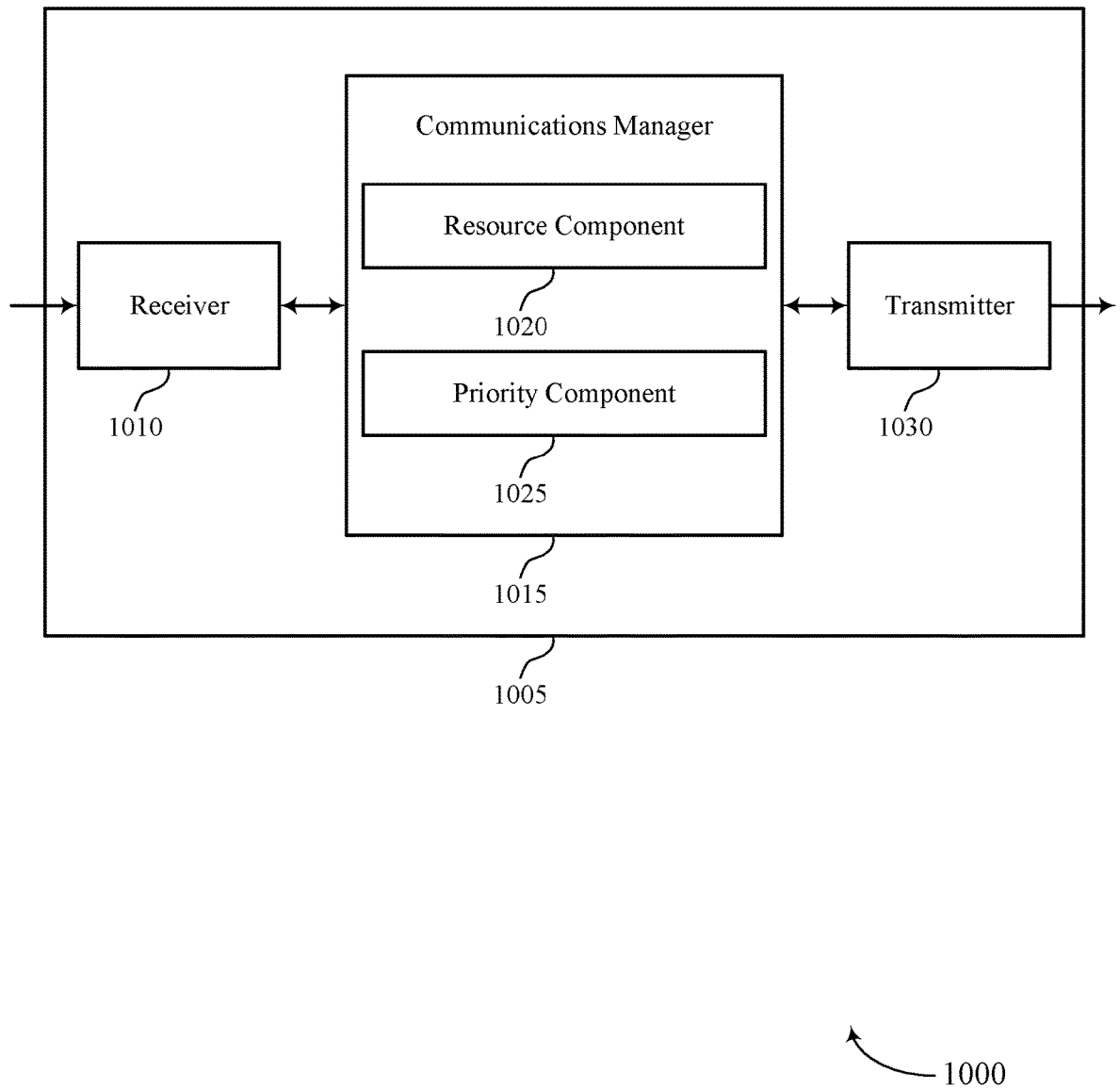

FIG. 10 shows a block diagram 1000 of a device 1005 that supports incentive-based relaying with prioritization in accordance with aspects of the present disclosure. The device 1005 may be an example of aspects of a device 905, or a base station 105 as described herein. The device 1005 may include a receiver 1010, a communications manager 1015, and a transmitter 1030. The device 1005 may also include a processor. Each of these components may be in communication with one another (e.g., via one or more buses).

The receiver 1010 may receive information such as packets, user data, or control information associated with various information channels (e.g., control channels, data channels, and information related to incentive-based relaying with prioritization, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a resource component 1020 and a priority component 1025. The communications manager 1015 may be an example of aspects of the communications manager 1210 described herein.

The resource component 1020 may transmit, to a UE of a set of UEs, an indication of resources for relaying a first data transmission from a source UE to one or more relay UEs.

The priority component 1025 may transmit, to the set of UEs, control signaling including a priority scheme for a set of data transmissions including the first data transmission and a second data transmission.

The transmitter 1030 may transmit signals generated by other components of the device 1005. In some examples, the transmitter 1030 may be collocated with a receiver 1010 in a transceiver module. For example, the transmitter 1030 may be an example of aspects of the transceiver 1220 described with reference to FIG. 12. The transmitter 1030 may utilize a single antenna or a set of antennas.

Figure 11:
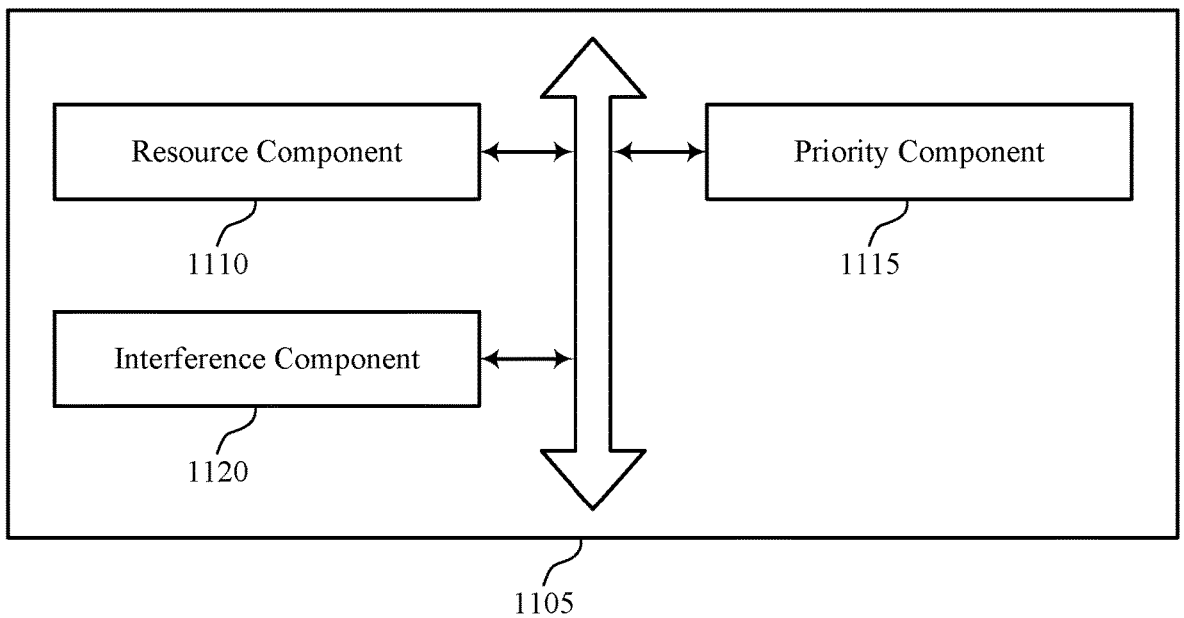
FIG. 11 shows a block diagram of a communications manager that supports incentive-based relaying with prioritization in accordance with aspects of the present disclosure.

FIG. 11 shows a block diagram 1100 of a communications manager 1105 that supports incentive-based relaying with prioritization in accordance with aspects of the present disclosure. The communications manager 1105 may be an example of aspects of a communications manager 915, a communications manager 1015, or a communications manager 1210 described herein. The communications manager 1105 may include a resource component 1110, a priority component 1115, and an interference component 1120. Each of these modules may communicate, directly or indirectly, with one another (e.g., via one or more buses).

The resource component 1110 may transmit, to a UE of a set of UEs, an indication of resources for relaying a first data transmission from a source UE to one or more relay UEs. The priority component 1115 may transmit, to the set of UEs, control signaling including a priority scheme for a set of data transmissions including the first data transmission and a second data transmission.

In some examples, the resource component 1110 may determine a first time-frequency resource allocation for the first data transmission and a second time-frequency resource allocation for the second data transmission. In some examples, the resource component 1110 may transmit, to the UE, the control signaling including an indication of a time resource allocation and a resource block allocation bitmap corresponding to the first data transmission and the second data transmission based on the first time-frequency resource allocation and the second time-frequency resource allocation. In some examples, the resource component 1110 may transmit, to the set of UEs, an indication of updated resources based on the priority scheme.

In some examples, the priority component 1115 may determine the first data transmission has a first priority and the second data transmission has a second priority greater than the first priority based on the priority scheme, where the priority scheme includes an indication of the first priority and the second priority. In some examples, the priority component 1115 may receive, from the UE, the second data transmission during the indicated resources based on the second priority being greater than the first priority.

In some examples, the priority component 1115 may determine the first data transmission has a first priority and the second data transmission has a second priority lower than the first priority, where the priority scheme includes an indication of the first priority and the second priority.

In some examples, the priority component 1115 may transmit a downlink control information message. The interference component 1120 may determine an interference value based on the first data transmission, the second data transmission, the priority scheme, or any combination thereof.

Figure 12:
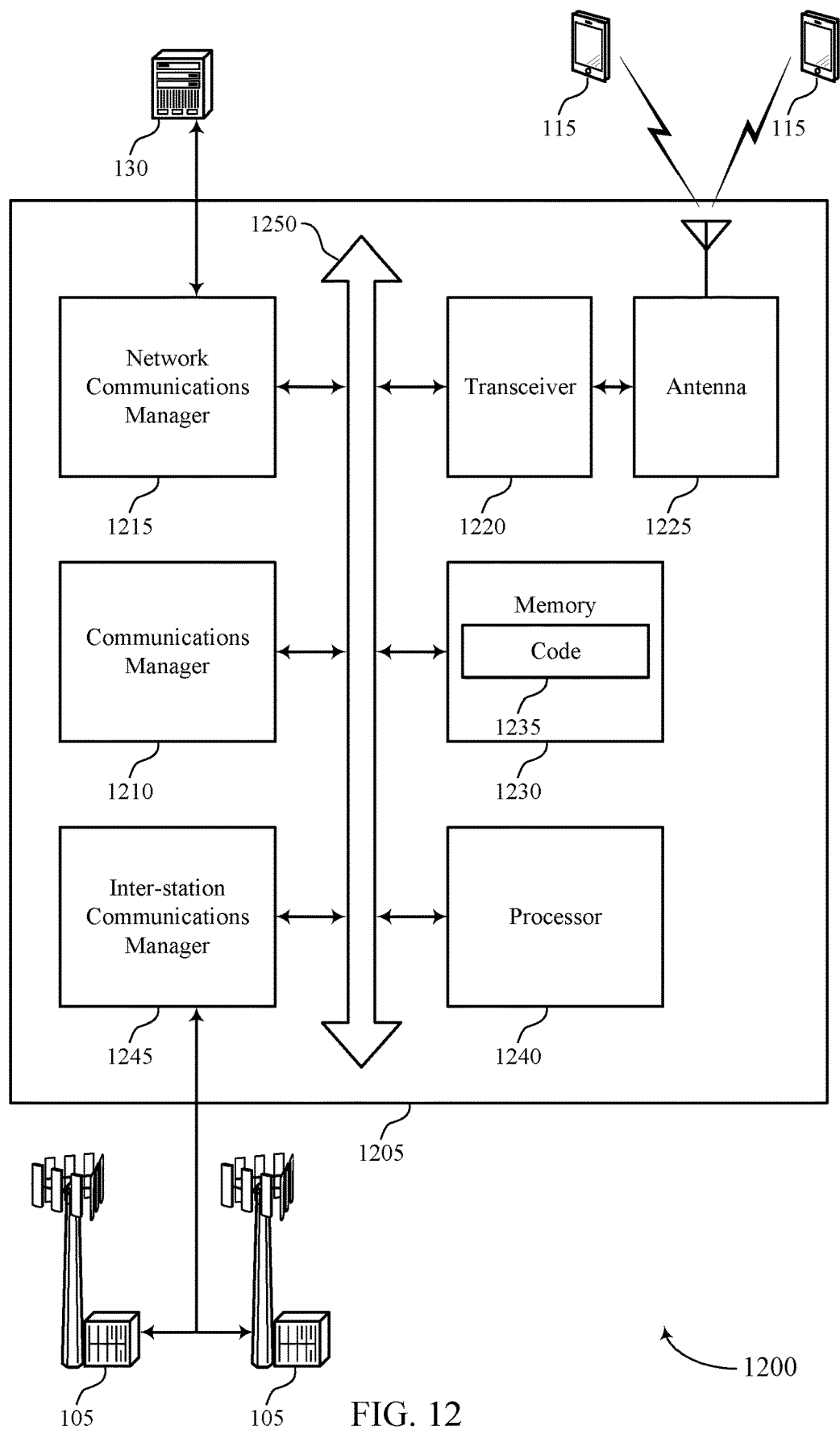
FIG. 12 shows a diagram of a system including a device that supports incentive-based relaying with prioritization in accordance with aspects of the present disclosure.

FIG. 12 shows a diagram of a system 1200 including a device 1205 that supports incentive-based relaying with prioritization in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may transmit, to a UE of a set of UEs, an indication of resources for relaying a first data transmission from a source UE to one or more relay UEs and transmit, to the set of UEs, control signaling including a priority scheme for a set of data transmissions including the first data transmission and a second data transmission.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a basic I/O system (BIOS) which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting incentive-based relaying with prioritization).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
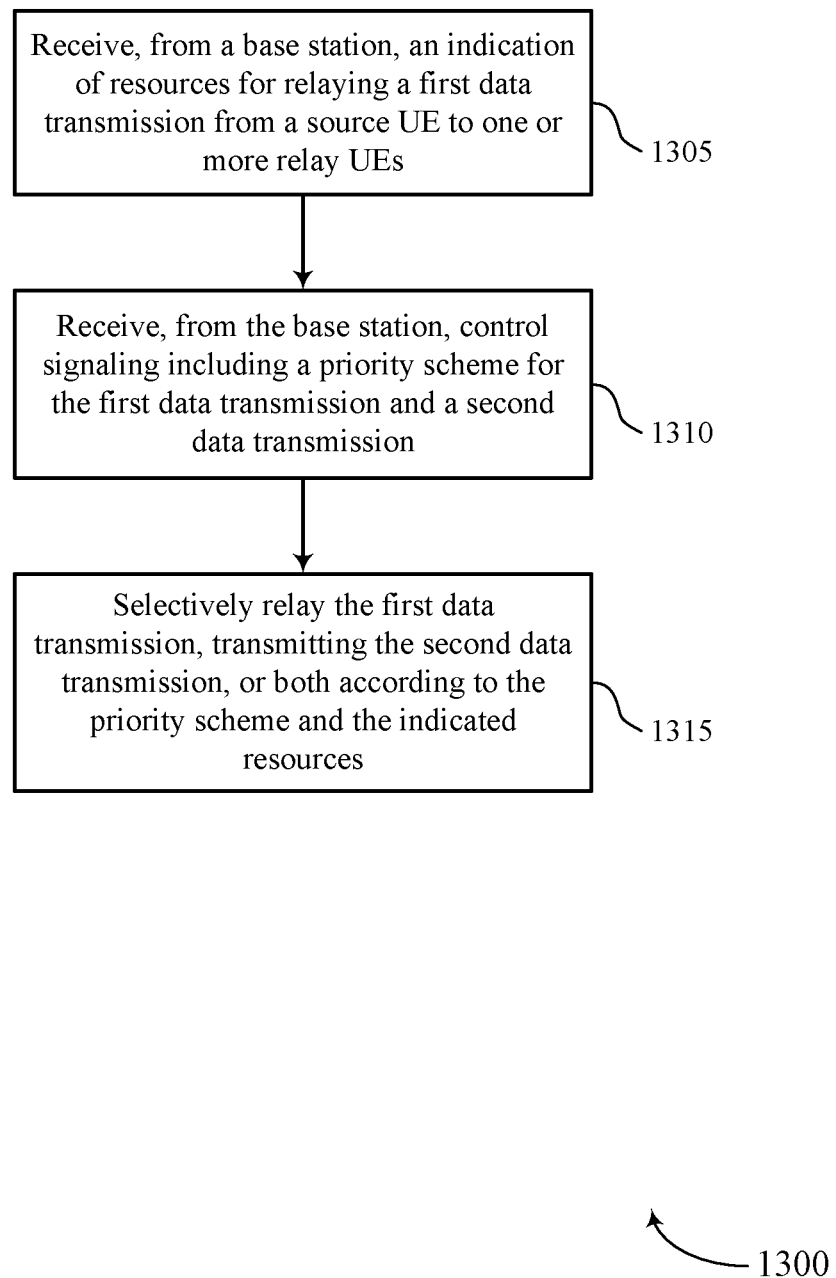
FIGS. 13 through 16 show flowcharts illustrating methods that support incentive-based relaying with prioritization in accordance with aspects of the present disclosure.

FIG. 13 shows a flowchart illustrating a method 1300 that supports incentive-based relaying with prioritization in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may receive, from a base station, an indication of resources for relaying a first data transmission from a source UE to one or more relay UEs. The operations of 1305 may be performed according to the methods described herein. In some examples, aspects of the operations of 1305 may be performed by a resource component as described with reference to FIGS. 5 through 8.

At 1310, the UE may receive, from the base station, control signaling including a priority scheme for the first data transmission and a second data transmission. The operations of 1310 may be performed according to the methods described herein. In some examples, aspects of the operations of 1310 may be performed by a priority component as described with reference to FIGS. 5 through 8.

At 1315, the UE may selectively relay the first data transmission, transmitting the second data transmission, or both according to the priority scheme and the indicated resources. The operations of 1315 may be performed according to the methods described herein. In some examples, aspects of the operations of 1315 may be performed by a relay component as described with reference to FIGS. 5 through 8.

Figure 14:
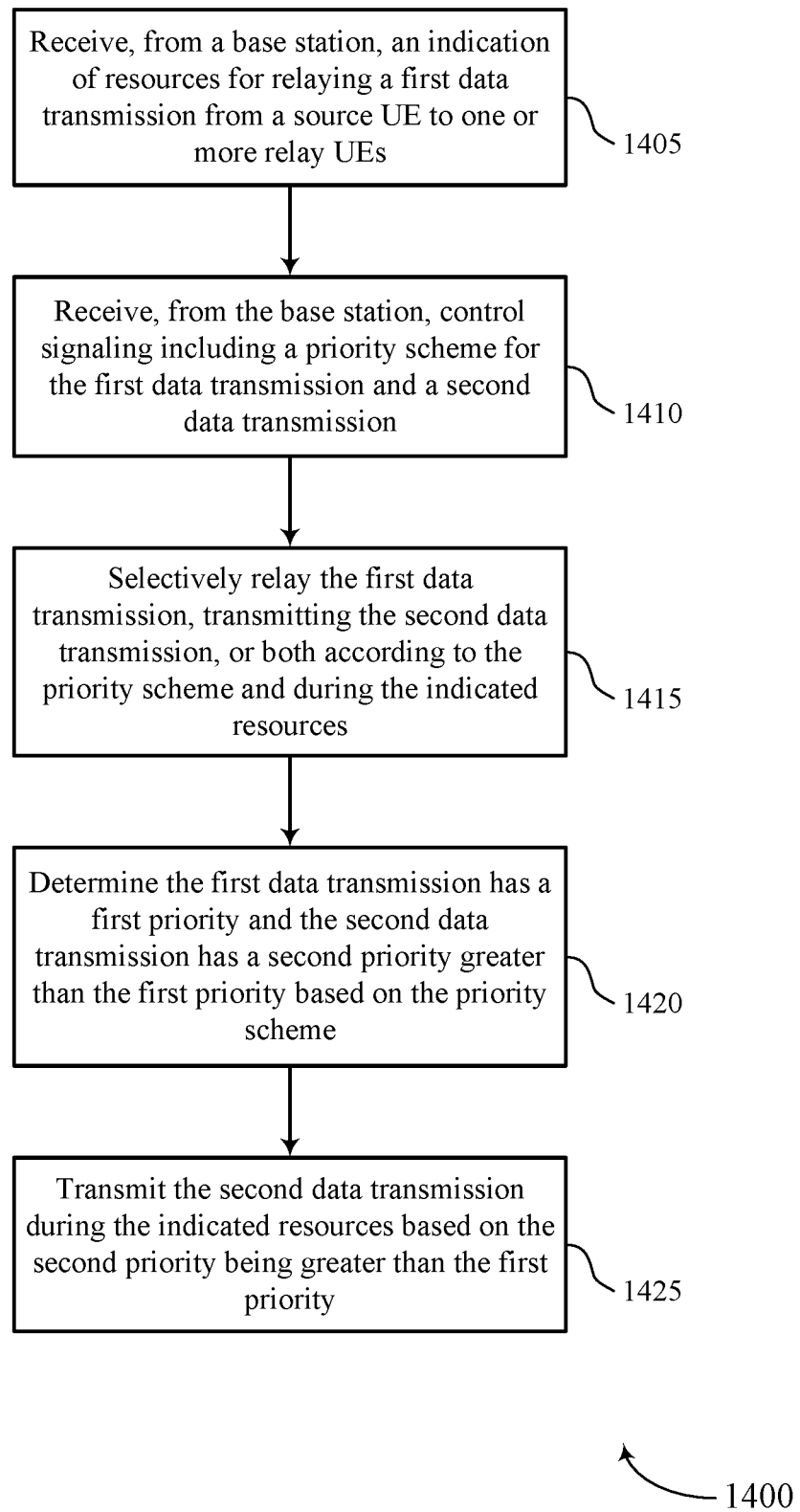

FIG. 14 shows a flowchart illustrating a method 1400 that supports incentive-based relaying with prioritization in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may receive, from a base station, an indication of resources for relaying a first data transmission from a source UE to one or more relay UEs. The operations of 1405 may be performed according to the methods described herein. In some examples, aspects of the operations of 1405 may be performed by a resource component as described with reference to FIGS. 5 through 8.

At 1410, the UE may receive, from the base station, control signaling including a priority scheme for the first data transmission and a second data transmission. The operations of 1410 may be performed according to the methods described herein. In some examples, aspects of the operations of 1410 may be performed by a priority component as described with reference to FIGS. 5 through 8.

At 1415, the UE may selectively relay the first data transmission, transmitting the second data transmission, or both according to the priority scheme and during the indicated resources. The operations of 1415 may be performed according to the methods described herein. In some examples, aspects of the operations of 1415 may be performed by a relay component as described with reference to FIGS. 5 through 8.

At 1420, the UE may determine the first data transmission has a first priority and the second data transmission has a second priority greater than the first priority based on the priority scheme. The operations of 1420 may be performed according to the methods described herein. In some examples, aspects of the operations of 1420 may be performed by a priority component as described with reference to FIGS. 5 through 8.

At 1425, the UE may transmit the second data transmission during the indicated resources based on the second priority being greater than the first priority. The operations of 1425 may be performed according to the methods described herein. In some examples, aspects of the operations of 1425 may be performed by a priority component as described with reference to FIGS. 5 through 8.

Figure 15:
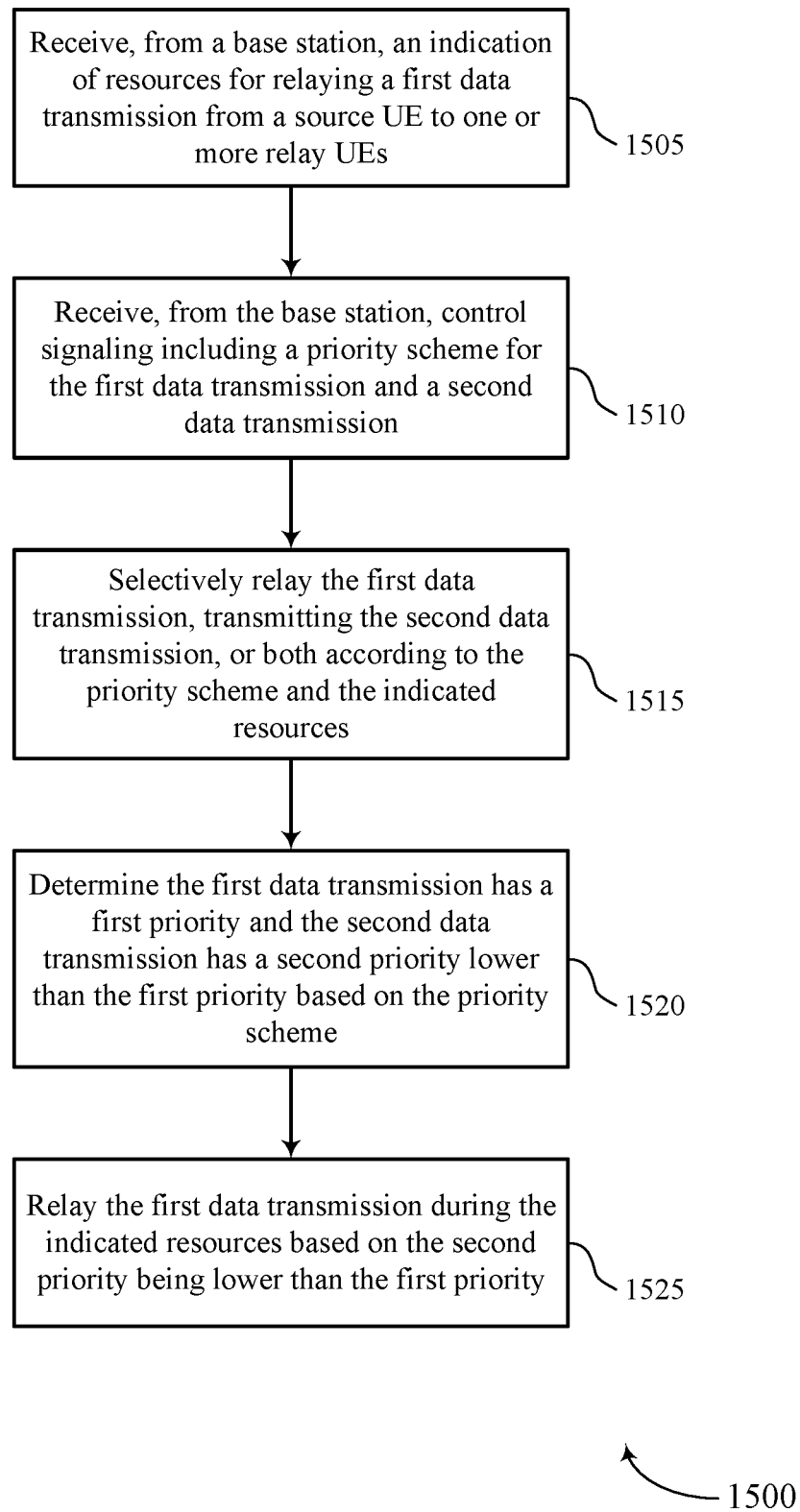

FIG. 15 shows a flowchart illustrating a method 1500 that supports incentive-based relaying with prioritization in accordance with aspects of the present disclosure. The operations of method 1500 may be implemented by a UE 115 or its components as described herein. For example, the operations of method 1500 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1505, the UE may receive, from a base station, an indication of resources for relaying a first data transmission from a source UE to one or more relay UEs. The operations of 1505 may be performed according to the methods described herein. In some examples, aspects of the operations of 1505 may be performed by a resource component as described with reference to FIGS. 5 through 8.

At 1510, the UE may receive, from the base station, control signaling including a priority scheme for the first data transmission and a second data transmission. The operations of 1510 may be performed according to the methods described herein. In some examples, aspects of the operations of 1510 may be performed by a priority component as described with reference to FIGS. 5 through 8.

At 1515, the UE may selectively relay the first data transmission, transmitting the second data transmission, or both according to the priority scheme and the indicated resources. The operations of 1515 may be performed according to the methods described herein. In some examples, aspects of the operations of 1515 may be performed by a relay component as described with reference to FIGS. 5 through 8.

At 1520, the UE may determine the first data transmission has a first priority and the second data transmission has a second priority lower than the first priority based on the priority scheme. The operations of 1520 may be performed according to the methods described herein. In some examples, aspects of the operations of 1520 may be performed by a priority component as described with reference to FIGS. 5 through 8.

At 1525, the UE may relay the first data transmission during the indicated resources based on the second priority being lower than the first priority. The operations of 1525 may be performed according to the methods described herein. In some examples, aspects of the operations of 1525 may be performed by a priority component as described with reference to FIGS. 5 through 8.

Figure 16:
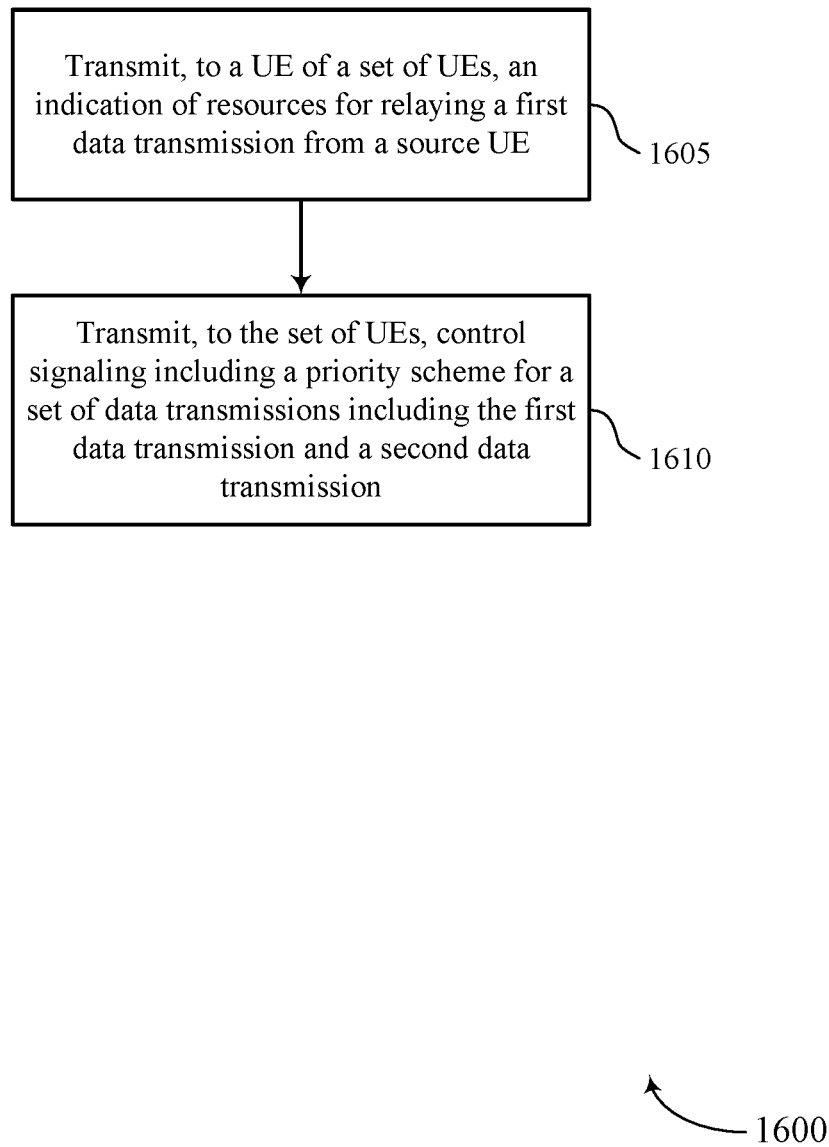

FIG. 16 shows a flowchart illustrating a method 1600 that supports incentive-based relaying with prioritization in accordance with aspects of the present disclosure. The operations of method 1600 may be implemented by a base station 105 or its components as described herein. For example, the operations of method 1600 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1605, the base station may transmit, to a UE of a set of UEs, an indication of resources for relaying a first data transmission from a source UE. The operations of 1605 may be performed according to the methods described herein. In some examples, aspects of the operations of 1605 may be performed by a resource component as described with reference to FIGS. 9 through 12.

At 1610, the base station may transmit, to the set of UEs, control signaling including a priority scheme for a set of data transmissions including the first data transmission and a second data transmission. The operations of 1610 may be performed according to the methods described herein. In some examples, aspects of the operations of 1610 may be performed by a priority component as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

The following aspects are given by way of illustration. Examples of the following aspects may be combined with examples or embodiments shown or discussed in relation to the figures or elsewhere herein.

Aspect 1: A method for wireless communications at a UE, comprising: receiving, from a base station, an indication of resources for relaying a first data transmission from a source UE to one or more relay UEs; receiving, from the base station, control signaling comprising a priority scheme for the first data transmission and a second data transmission; and selectively relaying the first data transmission, transmitting the second data transmission, or both according to the priority scheme and the indicated resources.

Aspect 2: The method of aspect 1, wherein: the control signaling comprises a first priority indication for relaying the first data transmission; and the selectively relaying the first data transmission, transmitting the second data transmission, or both comprise relaying the first data transmission based at least in part on the received first priority indication.

Aspect 3: The method of aspect 1, wherein: the control signaling comprises a third priority indication for both relaying the first data transmission and transmitting the second data transmission; and the selectively relaying the first data transmission, transmitting the second data transmission, or both comprise relaying the first data transmission and transmitting the second data transmission based at least in part on the received third priority indication.

Aspect 4: The method of aspect 1, wherein: the control signaling comprises a second priority indication for transmitting the second data transmission; and the selectively relaying the first data transmission, transmitting the second data transmission, or both comprise transmitting the second data transmission based at least in part on the received second priority indication.

Aspect 5: The method of aspect 4, wherein: the control signaling comprises a power factor associated with the first data transmission and the second data transmission; and the method further comprising: transmitting the first data transmission at a power level different from the second data transmission based at least in part on the received power factor.

Aspect 6: The method of aspect 1, further comprising: determining the first data transmission has a first priority and the second data transmission has a second priority greater than the first priority based at least in part on the priority scheme; and transmitting the second data transmission according to the indicated resources based at least in part on the second priority being greater than the first priority.

Aspect 7: The method of aspect 1, further comprising: determining the first data transmission has a first priority and the second data transmission has a second priority lower than the first priority based at least in part on the priority scheme; and relaying the first data transmission according to the indicated resources based at least in part on the second priority being lower than the first priority.

Aspect 8: The method of any of aspects 1 to 7, further comprising: determining a first power allocation for the first data transmission and a second power allocation for the second data transmission; and relaying the first data transmission and transmitting the second data transmission according to the indicated resources according to the first power allocation and the second power allocation, wherein the first power allocation is different from the second power allocation.

Aspect 9: The method of any of aspects 1 to 8, further comprising: determining a first time-frequency resource allocation for the first data transmission and a second time-frequency resource allocation for the second data transmission; and relaying the first data transmission and transmitting the second data transmission according to the first time-frequency resource allocation and the second time-frequency resource allocation.

Aspect 10: The method of any of aspect 9, wherein determining the first time-frequency resource allocation and the second time-frequency resource allocation comprises: receiving, from the base station, the control signaling comprising an indication of a time resource allocation and a resource block allocation bitmap corresponding to the first data transmission and the second data transmission.

Aspect 11: The method of any of aspects 1 to 10, further comprising: receiving, from the base station, an indication of updated resources based at least in part on the priority scheme.

Aspect 12: The method of any of aspects 1 to 11, wherein the control signaling comprises a DCI message.

Aspect 13: The method of any of aspects 1 to 12, wherein the indication of resources is received via RRC or MAC-CE signaling.

Aspect 14: The method of any of aspects 1 to 13, wherein the second data transmission is a data transmission from the UE to the one or more relay UEs, to the base station, or both.

Aspect 15: A method for wireless communications at a base station, comprising: transmitting, to a UE of a plurality of UEs, an indication of resources for relaying a first data transmission from a source UE; and transmitting, to the plurality of UEs, control signaling comprising a priority scheme for a plurality of data transmissions comprising the first data transmission and a second data transmission.

Aspect 16: The method of aspect 15, wherein the control signaling comprises a first priority indication for the first data transmission, the method further comprising: receiving, from the UE, the first data transmission associated with data from the source UE based at least in part on the transmitted first priority indication.

Aspect 17: The method of aspect 15, wherein the control signaling comprises a second priority indication for the second data transmission, the method further comprising: receiving, from the UE, the second data transmission associated with data of the UE based at least in part on the transmitted second priority indication.

Aspect 18: The method of aspect 15, wherein the control signaling comprises a third priority indication for the first data transmission and the second data transmission, the method further comprising: receiving, from the UE, the first data transmission associated with data from the source UE and the second data transmission associated with data of the UE based at least in part on the transmitted third priority indication.

Aspect 19: The method of aspect 15, wherein transmitting the control signaling further comprises: determining the first data transmission has a first priority and the second data transmission has a second priority greater than the first priority based at least in part on the priority scheme, wherein the priority scheme comprises an indication of the first priority and the second priority.

Aspect 20: The method of aspect 19, further comprising: receiving, from the UE, the second data transmission during the indicated resources based at least in part on the second priority being greater than the first priority.

Aspect 21: The method of aspect 15, wherein transmitting the control signaling comprises: determining the first data transmission has a first priority and the second data transmission has a second priority greater than the first priority based at least in part on the priority scheme, wherein the priority scheme comprises an indication of the first priority and the second priority.

Aspect 22: The method of aspect 15, further comprising: determining a first time-frequency resource allocation for the first data transmission and a second time-frequency resource allocation for the second data transmission; and transmitting, to the UE, the control signaling comprising an indication of a time resource allocation and a resource block allocation bitmap corresponding to the first data transmission and the second data transmission based at least in part on the first time-frequency resource allocation and the second time-frequency resource allocation.

Aspect 23: The method of any of aspects 15 to 22, further comprising: transmitting, to the plurality of UEs, an indication of updated resources based at least in part on the priority scheme.

Aspect 24: The method of any of aspects 15 to 23, further comprising: determining an interference value based at least in part on one or more of the first data transmission, the second data transmission, or the priority scheme.

Aspect 25: The method of any of aspects 15 to 24, wherein transmitting the control signaling comprises: transmitting a DCI message.

Aspect 26: The method of any of aspects 15 to 25, wherein the second data transmission is a data transmission from the UE to the one or more relay UEs, to the base station, or both.

Aspect 27: An apparatus for wireless communications comprising a processor; memory coupled with the processor; and instructions stored in the memory and executable by the processor to cause the apparatus to perform a method of any of aspects 1 to 14.

Aspect 28: An apparatus for wireless communications comprising a processor; and memory coupled to the processor, the processor and memory configured to perform a method of any of aspects 15 to 26.

Aspect 29: An apparatus comprising at least one means for performing a method of any of aspects 1 to 14.

Aspect 30: An apparatus comprising at least one means for performing a method of any of aspects 15 to 26.

Aspect 31: A non-transitory computer-readable medium storing code for wireless communications, the code comprising instructions executable by a processor to perform a method of any of aspects 1 to 14.

Aspect 32: A non-transitory computer-readable medium storing code for wireless communications, the code comprising instructions executable by a processor to perform a method of any of aspects 15 to 26.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A user equipment (UE) for wireless communication, comprising:
at least one memory; and
at least one processor coupled to the memory, wherein the at least one processor is configured to:
receive an indication of resources for relaying a first data transmission from a source UE to one or more relay UEs;
receive control signaling comprising a priority scheme, wherein the priority scheme comprises a first priority value associated with the first data transmission and a second priority value associated with a second data transmission;
perform one or more actions according to the priority scheme and the resources, wherein the one or more actions include: relay the first data transmission, transmit the second data transmission, or both; and
receive an indication of updated resources based at least in part on the priority scheme.

2. The UE of claim 1, wherein, to perform the one or more actions, the at least one processor is configured to relay the first data transmission based at least in part on the received first priority value.

3. The UE of claim 1, wherein, to perform the one or more actions, the at least one processor is configured to transmit the second data transmission based at least in part on the received second priority value.

4. The UE of claim 1, wherein:
the control signaling comprises a third priority value for both relaying the first data transmission and transmitting the second data transmission; and
to perform the one or more actions, the at least one processor is configured to relay the first data transmission and transmit the second data transmission based at least in part on the third priority value.

5. The UE of claim 4, wherein:
the control signaling comprises a power factor associated with the first data transmission and the second data transmission; and the at least one processor is configured to:
transmit the first data transmission at a power level different from the second data transmission based at least in part on the power factor.

6. The UE of claim 1, wherein the at least one processor is configured to:
determine the first data transmission has a first priority and the second data transmission has a second priority greater than the first priority based at least in part on the priority scheme; and
transmit the second data transmission according to the indicated resources based at least in part on the second priority being greater than the first priority.

7. The UE of claim 1, wherein the at least one processor is configured to:
determine the first data transmission has a first priority and the second data transmission has a second priority lower than the first priority based at least in part on the priority scheme; and
relay the first data transmission according to the indicated resources based at least in part on the second priority being lower than the first priority.

8. The UE of claim 1, wherein the at least one processor is configured to:
determine a first power allocation for the first data transmission and a second power allocation for the second data transmission; and
relay the first data transmission and transmitting the second data transmission according to the indicated resources according to the first power allocation and the second power allocation, wherein the first power allocation is different from the second power allocation.

9. The UE of claim 1, wherein the at least one processor is configured to:
determine a first time-frequency resource allocation for the first data transmission and a second time-frequency resource allocation for the second data transmission; and
relay the first data transmission and transmitting the second data transmission according to the first time-frequency resource allocation and the second time-frequency resource allocation.

10. The UE of claim 9, wherein to determine the first time-frequency resource allocation and the second time-frequency resource allocation the at least one processor is configured to:
receive, the control signaling comprising an indication of a time resource allocation and a resource block allocation bitmap corresponding to the first data transmission and the second data transmission.

11. The UE of claim 1, wherein the control signaling comprises a downlink control information (DCI) message.

12. The UE of claim 1, wherein the indication of resources is received via radio resource control (RRC) or medium access control-control element (MAC-CE) signaling.

13. The UE of claim 1, wherein the second data transmission is a data transmission from the UE to the one or more relay UEs, to a base station, or both.

14. A base station for wireless communication, comprising:
at least one memory; and
at least one processor coupled to the memory, wherein the at least one processor is configured to:
transmit, to a user equipment (UE) of a plurality of UEs, an indication of resources for relaying a first data transmission from a source UE;
transmit, to the plurality of UEs, control signaling comprising a priority scheme, wherein the priority scheme comprises a priority value for each of a plurality of data transmissions comprising the first data transmission and a second data transmission; and
transmit, to the plurality of UEs, an indication of updated resources based at least in part on the priority scheme.

15. The base station of claim 14, wherein the control signaling comprises a first priority value for the first data transmission, and the at least one processor is configured to:
receive, from the UE, the first data transmission associated with data from the source UE based at least in part on the transmitted first priority value.

16. The base station of claim 14, wherein the control signaling comprises a second priority value for the second data transmission, and the at least one processor is configured to:
receive, from the UE, the second data transmission associated with data of the UE based at least in part on the transmitted second priority value.

17. The base station of claim 14, wherein the control signaling comprises a third priority value for the first data transmission and the second data transmission, and the at least one processor is configured to:
receive, from the UE, the first data transmission associated with data from the source UE and the second data transmission associated with data of the UE based at least in part on the third priority value.

18. The base station of claim 14, wherein to transmit the control signaling the at least one processor is configured to:
determine the first data transmission has a first priority and the second data transmission has a second priority greater than the first priority based at least in part on the priority scheme, wherein the priority scheme comprises a first priority value associated with the first priority and a second priority value associated with the second priority.

19. The base station of claim 18, wherein the at least one processor is configured to:
receive, from the UE, the second data transmission according to the indicated resources based at least in part on the second priority being greater than the first priority.

20. The base station of claim 14, wherein to transmit the control signaling the at least one processor is configured to:
determine the first data transmission has a first priority and the second data transmission has a second priority lower than the first priority, wherein the priority scheme comprises a first priority value associated with the first priority and a second priority value associated with the second priority.

21. The base station of claim 14, wherein the at least one processor is configured to:
determine a first time-frequency resource allocation for the first data transmission and a second time-frequency resource allocation for the second data transmission; and
transmit, to the UE, the control signaling comprising an indication of a time resource allocation and a resource block allocation bitmap corresponding to the first data transmission and the second data transmission based at least in part on the first time-frequency resource allocation and the second time-frequency resource allocation.

22. The base station of claim 14, wherein to transmit the control signaling the at least one processor is configured to:
transmit a downlink control information message.

23. A method for wireless communications performed by a user equipment (UE), comprising:
receiving an indication of resources for relaying a first data transmission from a source UE to one or more relay UEs;
receiving control signaling comprising a priority scheme, wherein the priority scheme comprises a first priority value associated with the first data transmission and a second priority value associated with a second data transmission;
performing one or more actions according to the priority scheme and the resources, wherein the one or more actions include: relaying the first data transmission, transmitting the second data transmission, or both; and
receiving an indication of updated resources based at least in part on the priority scheme.

24. The method of claim 23, wherein:
performing the one or more actions comprises:
relaying the first data transmission based at least in part on the first priority value.

25. The method of claim 23, further comprising:
determining the first data transmission has a first priority and the second data transmission has a second priority greater than the first priority based at least in part on the priority scheme; and
transmitting the second data transmission during the resources based at least in part on the second priority being greater than the first priority.

26. A method for wireless communications at a base station, comprising:
transmitting, to a user equipment (UE) of a plurality of UEs, an indication of resources for relaying a first data transmission from a source UE;
transmitting, to the plurality of UEs, control signaling comprising a priority scheme, wherein the priority scheme comprises a priority value for each of a plurality of data transmissions comprising the first data transmission and a second data transmission; and
transmitting, to the plurality of UEs, an indication of updated resources based at least in part on the priority scheme.

27. The method of claim 26, wherein transmitting the control signaling comprises:

transmitting the control signaling comprising a first priority value associated with the first data transmission; and receiving, from the UE, the first data transmission associated with data from the source UE based at least in part on the first priority value.

28. The method of claim 26, wherein transmitting control signaling comprises:

determining the first data transmission has a first priority and the second data transmission has a second priority greater than the first priority based at least in part on the priority scheme, wherein the priority scheme comprises a first priority value associated with the first priority and a second priority value associated with the second priority; and receiving, from the UE, the second data transmission according to the resources based at least in part on the second priority being greater than the first priority.

* * * * *